(12) United States Patent
Yeung et al.

(10) Patent No.: US 11,945,973 B2
(45) Date of Patent: Apr. 2, 2024

(54) IONIC LIQUID-BASED COATING AND METHOD OF MAKING ARTICLES COATED WITH THE SAME

(71) Applicant: THE HONG KONG UNIVERSITY OF SCIENCE AND TECHNOLOGY, Hong Kong (CN)

(72) Inventors: King Lun Yeung, Hong Kong (CN); Wei Han, Hong Kong (CN); Xizi Song, Hong Kong (CN); Joseph Kai Cho Kwan, Hong Kong (CN); Yutang Luo, Hong Kong (CN)

(73) Assignee: THE HONG KONG UNIVERSITY OF SCIENCE AND TECHNOLOGY, Hong Kong (CN)

(*) Notice: Subject to any disclaimer, the term of this patent is extended or adjusted under 35 U.S.C. 154(b) by 462 days.

(21) Appl. No.: 16/874,402

(22) Filed: May 14, 2020

(65) Prior Publication Data
US 2020/0362179 A1    Nov. 19, 2020

Related U.S. Application Data

(60) Provisional application No. 62/920,764, filed on May 15, 2019.

(51) Int. Cl.
*C09D 7/61* (2018.01)
*B01D 46/00* (2022.01)
(Continued)

(52) U.S. Cl.
CPC ........... *C09D 7/61* (2018.01); *B01D 46/0028* (2013.01); *B05D 3/10* (2013.01); *C09D 5/14* (2013.01); *B05D 2350/60* (2013.01); *C09J 1/00* (2013.01)

(58) Field of Classification Search
CPC ..... C09D 5/14; C09D 7/61; C09J 1/00; B01D 46/0028; B05D 3/10; B05D 2350/60
See application file for complete search history.

(56) References Cited

U.S. PATENT DOCUMENTS 8,957,243 B2    2/2015  Ragogna et al.
2006/0207722 A1* 9/2006  Amano ............... C09J 11/06
                                          428/411.1
(Continued)

FOREIGN PATENT DOCUMENTS

CN    101328335 A    12/2008
CN    103122187 A     5/2013
(Continued)

OTHER PUBLICATIONS

Qian, Wenjing, John Texter, and Feng Yan. "Frontiers in poly (ionic liquid) s: syntheses and applications." Chemical Society Reviews 46.4 (2017): 1124-1159.

*Primary Examiner* — James C Goloboy
(74) *Attorney, Agent, or Firm* — Nath, Goldberg & Meyer; Joshua B. Goldberg; Morgan D. Rosenberg

(57) ABSTRACT

The ionic liquid-based coating is a coating for both porous and nonporous materials. As non-limiting examples, a porous substrate coated with the ionic liquid-based coating may be used to disinfect and remove microorganisms from air and water, to provide an antimicrobial surface for preventing microbial contamination, or to enhance filtration efficiency of the porous material for airborne and waterborne particulate matter without increasing flow resistance. As a further non-limiting example, a nonporous substrate coated with the ionic liquid-based coating may be used to form a surface capable of self-disinfection from microorganisms contacting surface. The ionic liquid-based coating includes at least one ionic liquid, an adhesive, and at least one
(Continued)

additive, which may be a disinfectant, a viscosity modifier, a pH buffer, a fragrance, or combinations thereof.

9 Claims, 19 Drawing Sheets

(51) Int. Cl.
*B05D 3/10* (2006.01)
*C09D 5/14* (2006.01)
*C09J 1/00* (2006.01)

(56) References Cited

U.S. PATENT DOCUMENTS

| | | |
|---|---|---|
| 2006/0240727 A1 | 10/2006 | Price et al. |
| 2010/0282083 A1 | 11/2010 | Edwards |
| 2013/0211028 A1* | 8/2013 | Shinike .................... C09J 11/04 526/307.5 |
| 2014/0248490 A1* | 9/2014 | Morimoto ............... C08L 71/02 524/106 |
| 2014/0272408 A1* | 9/2014 | Amano ...................... C09J 7/38 524/378 |
| 2015/0299542 A1* | 10/2015 | Determan ................. C08L 9/02 428/339 |
| 2018/0305593 A1* | 10/2018 | Akamatsu .................. C09J 9/02 |

FOREIGN PATENT DOCUMENTS

| | | | |
|---|---|---|---|
| CN | 104722163 A | 6/2015 | |
| CN | 107596874 A * | 1/2018 | |
| WO | 2009125222 A2 | 10/2009 | |
| WO | 2011056545 A2 | 5/2011 | |
| WO | WO-2018034151 A1 * | 2/2018 | ............. C09J 11/06 |
| WO | 2018144984 A1 | 8/2018 | |

* cited by examiner

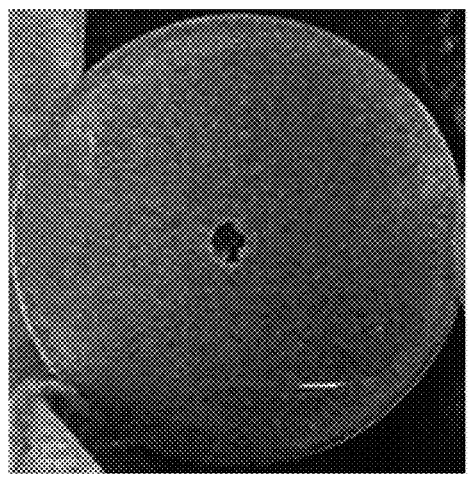
*FIG. 6A*
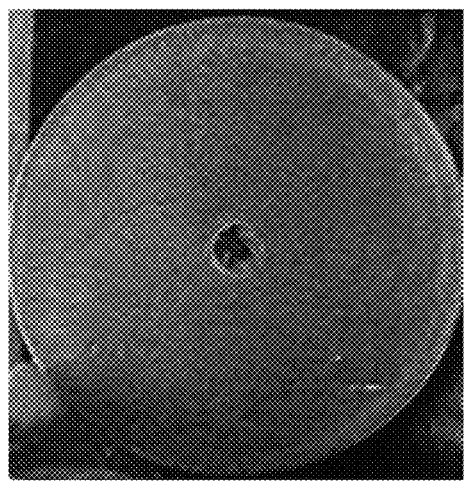
*FIG. 6B*
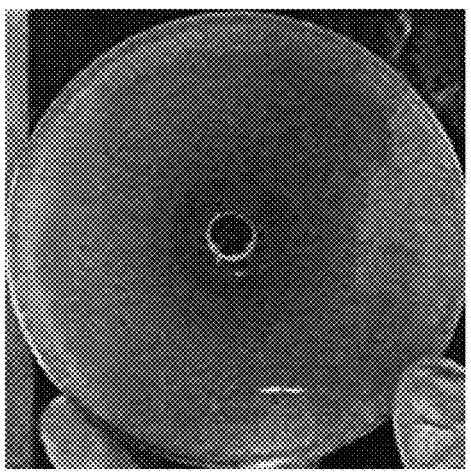
*FIG. 6C*
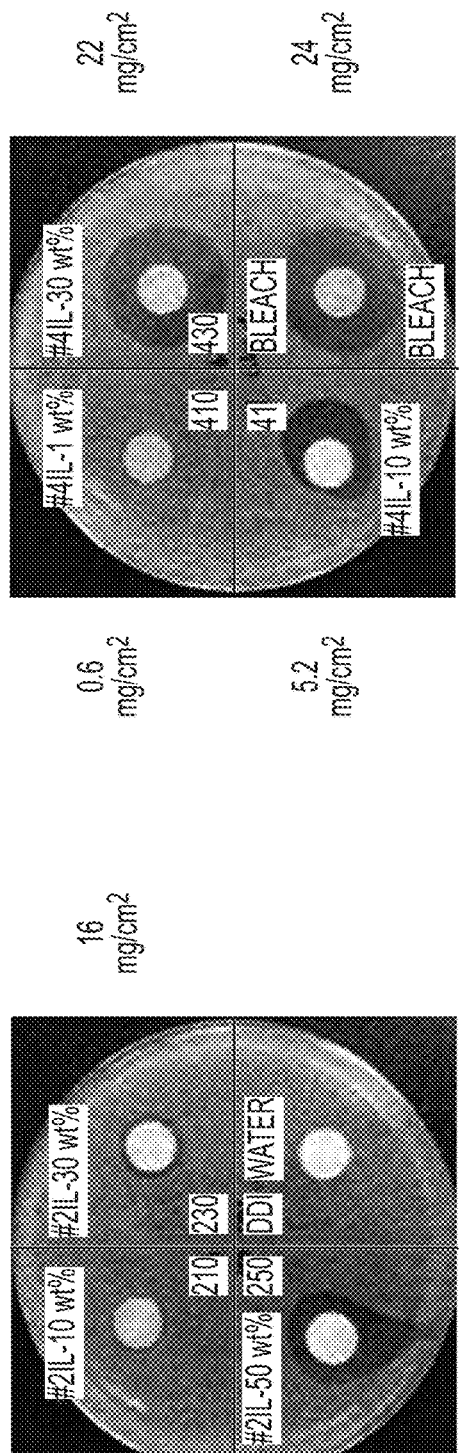
*FIG. 6D*
*FIG. 6E*

IONIC LIQUID-BASED COATING AND METHOD OF MAKING ARTICLES COATED WITH THE SAME

CROSS-REFERENCE TO RELATED APPLICATION

This application claims the benefit of U.S. Provisional Patent Application No. 62/920,764, filed on May 15, 2019.

BACKGROUND

1. Field

The disclosure of the present patent application relates to surface coatings, and particularly to an ionic liquid-based coating for forming antimicrobial and self-disinfecting surfaces on both porous and nonporous articles, as well as enhancing filtration properties of porous filter media.

2. Description of the Related Art

Most ionic liquids have intrinsic antimicrobial properties, and are considered ideal materials for environmental applications, since their low vapor pressures result in negligible emissions. Further, their excellent solvent properties allow them to absorb and dissolve other disinfectants or air pollutants, thus enhancing their intrinsic disinfection and purification capabilities. Further, the high chemical and thermal stabilities of ionic liquids ensure the absence of unwanted degradation byproducts. However, thus far, it has been difficult to take advantage of these desirable properties for surface coatings, since ionic liquids generally have very high viscosities and low surface wetting abilities, making it difficult to prepare uniform and stable ionic liquid-based coatings on porous or nonporous substrates. Thus, an ionic liquid-based coating and method of making articles coated with the same solving the aforementioned problems are desired.

SUMMARY

The ionic liquid-based coating is a coating for both porous and nonporous materials. As non-limiting examples, a porous substrate coated with the ionic liquid-based coating may be used to disinfect and remove microorganisms from air and water, to provide an antimicrobial surface for preventing microbial contamination, or to enhance filtration efficiency of the porous material for airborne and waterborne particulate matter without increasing flow resistance. As a further non-limiting example, a nonporous substrate coated with the ionic liquid-based coating may be used to form a surface capable of self-disinfection from microorganisms contacting the surface. The ionic liquid-based coating includes at least one ionic liquid, an adhesive, and at least one additive, which may be a disinfectant, a viscosity modifier, a pH buffer, a fragrance, or combinations thereof. When the ionic liquid-based coating is applied to a substrate to form a coated substrate, the coated substrate has disinfecting and/or antimicrobial properties, and when the ionic liquid-based coating is applied to a porous substrate to form a coated porous substrate, the coated porous substrate has increased filtration efficiency for airborne and/or waterborne particulate matter without increased flow resistance.

Non-limiting examples of the adhesive include sols or dispersions of metal oxides, zeolites, carbonaceous particles, or combinations thereof. As a further non-limiting example, the adhesive may be a silica sol prepared from a water-soluble silica source and silicon alkoxide, colloidal alumina, silica and titian sols, activated carbon sol, zeolite sol, or zeolite-metal oxide mixed sols. Typical water-soluble silica sources include, but are not limited to, silicate solutions, and typical silica alkoxides include, but are not limited to, tetramethyl orthosilicate, tetraethyl orthosilicate, and tetrapropyl orthosilicate. The sols or dispersions have different pH values, which can adjust the interaction between the at least one ionic liquid and the adhesive in order to achieve uniform and stable adsorption of the at least one ionic liquid on the adhesive interlayer.

Non-limiting examples of the at least one ionic liquid include cations selected from imidazolium, pyridinium, ammonium, phosphonium and combinations thereof. Further non-limiting examples of the at least one ionic liquid include anions selected from chloride, bromide, iodide, nitrate, hydrogen sulfate, acetate, tetrafluoroborate, hexafluorophosphate, thiocyanate, trifluoromethanesulfonate, bis(trifluoromethylsulfonyl)imide, and combinations thereof.

Non-limiting examples of a disinfectant additive include antimicrobial metal salts, antimicrobial metal particles, phytochemicals, essential oils, oxidizing disinfectants, and combinations thereof. Non-limiting examples of a viscosity modifier additive include water, methanol, ethanol, isopropanol, acetonitrile, tetrahydrofuran, and combinations thereof. Non-limiting examples of a pH buffer additive include acetic acid, sodium acetate, citric acid, sodium citrate, potassium dihydrogen phosphate, and combinations thereof. Non-limiting examples of a fragrance, or scent, additive include aliphatic hydrocarbon, aldehyde, alcohol, ester, aromatic compounds, and combinations thereof.

In order to make an article coated with the ionic liquid-based coating, the adhesive is applied to a substrate to form an adhesive interlayer thereon. A composite is then applied to the adhesive interlayer, where the composite is formed from the at least one ionic liquid and the at least one additive which, as described above, may be a disinfectant, a viscosity modifier, a pH buffer, a fragrance, or combinations thereof. As discussed above, the substrate may be either a porous substrate or a nonporous substrate. Non-limiting examples of application techniques for applying the adhesive to the substrate include at least one of wiping, brushing, dip-coating, spin-coating and spraying the adhesive on the substrate. Following application of the adhesive to the substrate, the adhesive may be dried. Non-limiting examples of application techniques for applying the composite to the adhesive interlayer include at least one of wiping, brushing, dip-coating, spin-coating and spraying the composite on the adhesive interlayer. Following application of the composite on the adhesive interlayer, the composite may be dried.

Alternatively, in order to make an article coated with the ionic liquid-based coating, an alternative composite is applied to the substrate. The composite includes the adhesive, the at least one ionic liquid, and the at least one additive, which may be a disinfectant, a viscosity modifier, a pH buffer, a fragrance, or combinations thereof. As discussed above, the substrate may be either a porous substrate or a nonporous substrate. In this embodiment, the at least one ionic liquid is incorporated into the adhesive to form the composite. Non-limiting examples of incorporation techniques for incorporating the the at least one ionic liquid into the adhesive to form the composite include physical mixing, electrostatic adsorption, and chemical functionalization. Non-limiting examples of application techniques for applying the composite to the substrate include at least one of wiping, brushing, dip-coating, spin-coating and spraying the composite on the substrate. Following application of the composite on the substrate, the composite may be dried. As noted above, the sols or dispersions have different pH values, which can adjust the interaction between the at least one ionic liquid and the adhesive in order to keep the composite of the at least one ionic liquid and the adhesive stable without any precipitation.

These and other features of the present subject matter will become readily apparent upon further review of the following specification.

BRIEF DESCRIPTION OF THE DRAWINGS

FIG. 6A is a photograph illustrating an inhibition zone of distilled deionized (DDI) water for an *E. coli* sample.

FIG. 6B is a photograph illustrating an inhibition zone of ethanol for an *E. coli* sample.

FIG. 6C is a photograph illustrating an inhibition zone of 1-ethyl-3-methylimidazolium tetrafluoroborate (EMIM-$BF_4$) ionic liquid for an *E. coli* sample.

FIG. 6D is a photograph illustrating inhibition zones of a HEPA filter sample with an EMIM-$BF_4$ ionic liquid coating for an *E. coli* sample.

FIG. 6E is a photograph illustrating inhibition zones of a HEPA filter sample with a 1-butyl-3-methylimidazolium iodide (BMIM-I) ionic liquid coating for an *E. coli* sample.

FIG. 12 is a bar graph comparing the antimicrobial activity against $10^5$ CFU/ml *S. aureus*, for a contact time of 10 minutes, of HEPA filters with BMIM-$BF_4$, BMIM-$BF_4$ and 1 wt % $Cu^{2+}$, BMIM-$BF_4$ and 5 wt % $Cu^{2+}$, BMIM-$BF_4$ and 1 wt % thymol, and BMIM-$BF_4$ and 5 wt % thymol coatings.

FIG. 13 is a plot comparing microbial number counts on commercial HEPA filters and HEPA filters with the ionic liquid-based coatings in a three-week field test.

FIG. 14 is a graph comparing filtration efficiencies for particulate matter of initial uncoated H11 and H13 HEPA filters, and H11 and H13 HEPA filters with the ionic liquid-based coatings.

FIG. 15 is a graph comparing filtration efficiencies for particulate matter of an initial uncoated H13 HEPA filter and H13 HEPA filters with a range of BMIM-I coating loadings.

FIG. 16 is a graph comparing filtration efficiencies for particulate matter of H13 HEPA filters with EMIM-$BF_4$, BMIM-$BF_4$, HMIM-$BF_4$ and DMIM-$BF_4$ ionic liquid coatings.

FIG. 17 is a graph comparing filtration efficiencies for particulate matter of an initial uncoated H13 HEPA filter, and H13 HEPA filters with ionic liquid coatings using $TiO_2$ sol, NaA zeolite sol and activated carbon (AC) sol as adhesives.

FIG. 18 is a graph comparing filtration efficiencies for particulate matter of an initial uncoated H13 HEPA filter, an H13 HEPA filter which is hydrothermally treated, an H13 HEPA filter with the ionic liquid-based coating, and an H13 HEPA filter with the ionic liquid-based coating which has been hydrothermally treated.

FIG. 19 is a graph comparing inhibition rates for A549 lung epithelial cells of bleach (1:99), ethanol, glycerol, and the ionic liquids of BMIM-I, BMIM-$BF_4$ and EMIM-$BF_4$.

Figure 1:
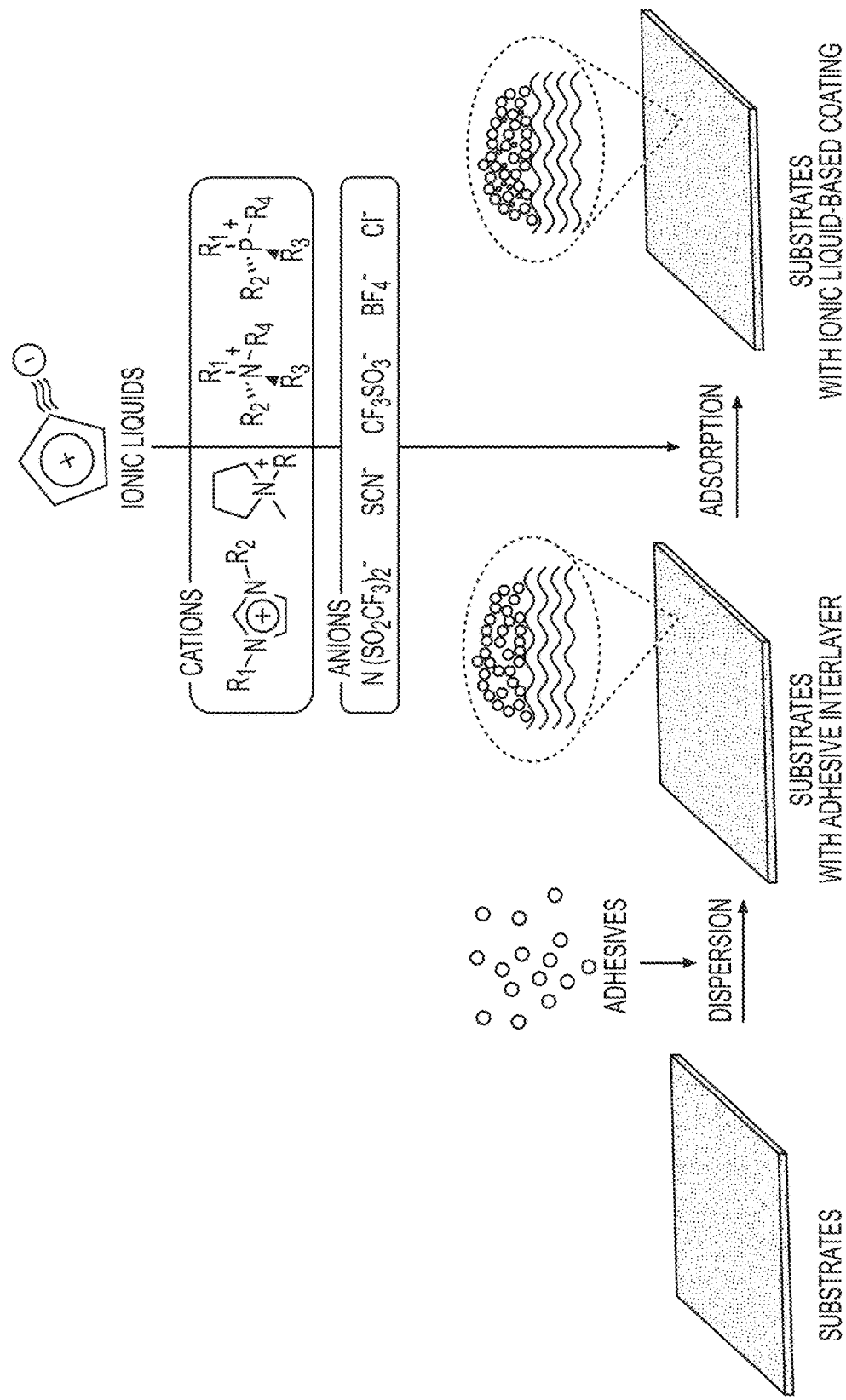
FIG. 1 schematically illustrates a method of making an article coated with an ionic liquid-based coating.

Similar reference characters denote corresponding features consistently throughout the attached drawings.

DETAILED DESCRIPTION OF THE PREFERRED EMBODIMENTS

The ionic liquid-based coating is a coating for both porous and nonporous materials. As non-limiting examples, a porous substrate coated with the ionic liquid-based coating may be used to disinfect and remove microorganisms from air and water, to provide an antimicrobial surface for preventing microbial contamination, or to enhance filtration efficiency of the porous material for airborne and waterborne particulate matter without increasing flow resistance. As a further non-limiting example, a nonporous substrate coated with the ionic liquid-based coating may be used to form a surface capable of self-disinfection from microorganisms contacting surface. The ionic liquid-based coating includes at least one ionic liquid, an adhesive, and at least one additive, which may be a disinfectant, a viscosity modifier, a pH buffer, a fragrance, or combinations thereof. Non-limiting examples of porous articles and substrates to which the ionic liquid-based coating may be applied include ceramic membranes, cellulose paper, and high-efficiency particulate air (HEPA) filters. Non-limiting examples of nonporous substrates to which the ionic liquid-based coating may be applied include glass surfaces and polyvinyl chloride plates.

Non-limiting examples of the adhesive include sols or dispersions of metal oxides, zeolites, carbonaceous particles, or combinations thereof. As a further non-limiting example, the adhesive may be a silica sol prepared from a water-soluble silica source and silicon alkoxide, colloidal alumina, silica and titian sols, activated carbon sol, zeolite sol, or zeolite-metal oxide mixed sols. Typical water-soluble silica sources include, but are not limited to, silicate solutions, and typical silica alkoxides include, but are not limited to, tetramethyl orthosilicate, tetraethyl orthosilicate, and tetrapropyl orthosilicate. The sols or dispersions have different pH values, which can adjust the interaction between the at least one ionic liquid and the adhesive in order to achieve uniform and stable adsorption of the at least one ionic liquid on the adhesive interlayer.

Non-limiting examples of the at least one ionic liquid include cations selected from imidazolium, pyridinium, ammonium, phosphonium and combinations thereof. Further non-limiting examples of the at least one ionic liquid include anions selected from chloride, bromide, iodide, nitrate, hydrogen sulfate, acetate, tetrafluoroborate, hexafluorophosphate, thiocyanate, trifluoromethanesulfonate, bis(trifluoromethylsulfonyl)imide, and combinations thereof.

Non-limiting examples of a disinfectant additive include antimicrobial metal salts, antimicrobial metal particles, phytochemicals, essential oils, oxidizing disinfectants, and combinations thereof. Non-limiting examples of a viscosity modifier additive include water, methanol, ethanol, isopropanol, acetonitrile, tetrahydrofuran, and combinations thereof. Non-limiting examples of a pH buffer additive include acetic acid, sodium acetate, citric acid, sodium citrate, potassium dihydrogen phosphate, and combinations thereof. Non-limiting examples of a fragrance, or scent, additive include aliphatic hydrocarbon, aldehyde, alcohol, ester, aromatic compounds, and combinations thereof.

As schematically illustrated in FIG. 1, in order to make an article coated with the ionic liquid-based coating, the adhesive is applied to a substrate to form an adhesive interlayer thereon. A composite is then applied to the adhesive interlayer, where the composite is formed from the at least one ionic liquid and the at least one additive which, as described above, may be a disinfectant, a viscosity modifier, a pH buffer, a fragrance, or combinations thereof. As discussed above, the substrate may be either a porous substrate or a nonporous substrate. Non-limiting examples of application techniques for applying the adhesive to the substrate include at least one of wiping, brushing, dip-coating, spin-coating and spraying the adhesive on the substrate. Following application of the adhesive to the substrate, the adhesive may be dried. Non-limiting examples of application techniques for applying the composite to the adhesive interlayer include at least one of wiping, brushing, dip-coating, spin-coating and spraying the composite on the adhesive interlayer. Following application of the composite on the adhesive interlayer, the composite may be dried.

Figure 2:
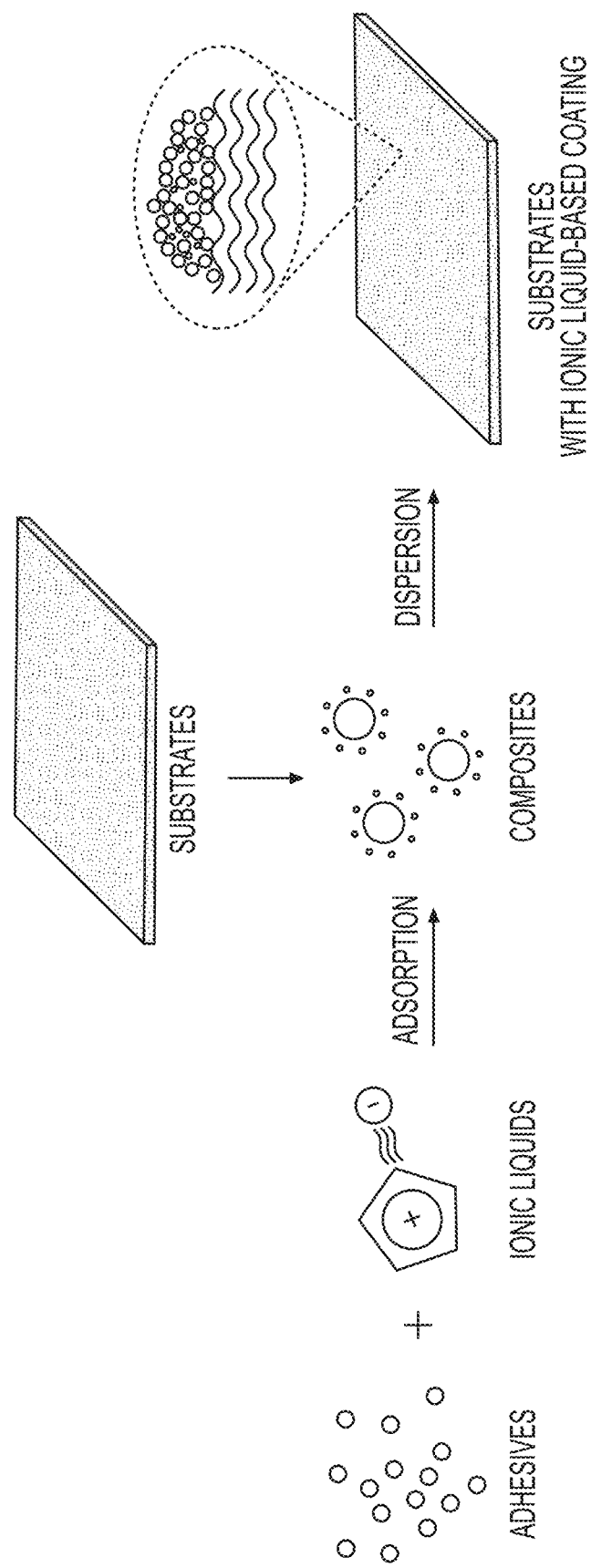
FIG. 2 schematically illustrates an alternative method of making an article coated with an ionic liquid-based coating.

Alternatively, as schematically illustrated in FIG. 2, in order to make an article coated with the ionic liquid-based coating, an alternative composite is applied to the substrate. The composite includes the adhesive, the at least one ionic liquid, and the at least one additive, which may be a disinfectant, a viscosity modifier, a pH buffer, a fragrance, or combinations thereof. As discussed above, the substrate may be either a porous substrate or a nonporous substrate. In this embodiment, the at least one ionic liquid is incorporated into the adhesive to form the composite. Non-limiting examples of incorporation techniques for incorporating the the at least one ionic liquid into the adhesive to form the composite include physical mixing, electrostatic adsorption, and chemical functionalization. Non-limiting examples of application techniques for applying the composite to the substrate include at least one of wiping, brushing, dip-coating, spin-coating and spraying the composite on the substrate. Following application of the composite on the substrate, the composite may be dried. As noted above, the sols or dispersions have different pH values, which can adjust the interaction between the at least one ionic liquid and the adhesive in order to keep the composite of the at least one ionic liquid and the adhesive stable without any precipitation.

Figure 3B:
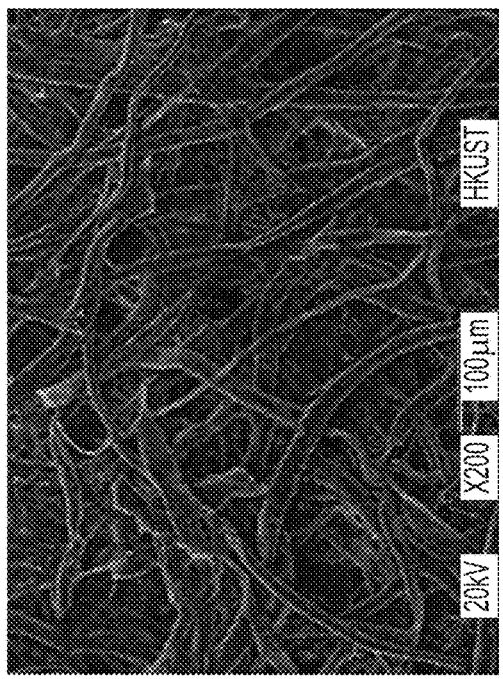
FIG. 3B is a SEM image of the cellulose paper with an adhesive interlayer formed thereon, shown at a magnification of ×200.
Figure 3D:
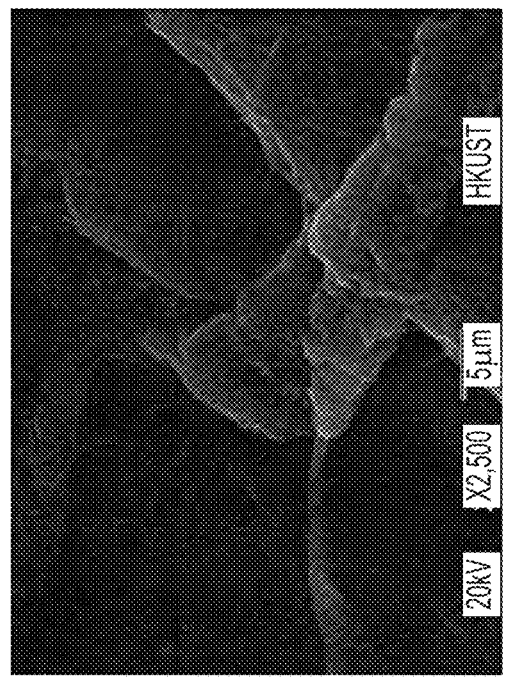
FIG. 3D is a SEM image of the cellulose paper with the ionic liquid-based coating coated thereon.
Figure 3A:
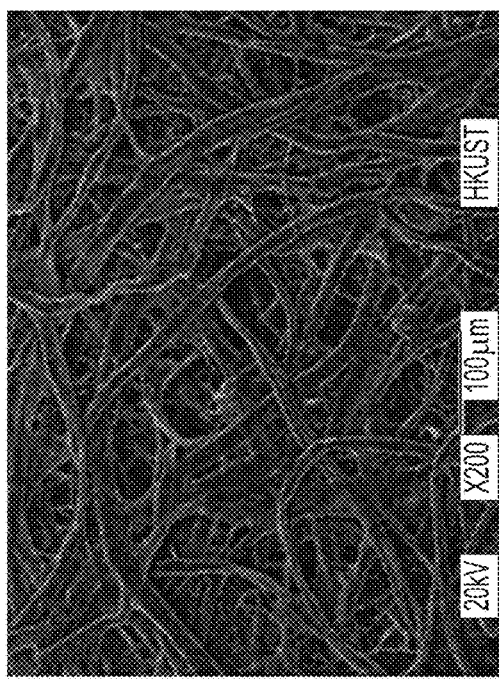
FIG. 3A is a scanning electron microscope (SEM) image of a sample of cellulose paper.
Figure 3C:
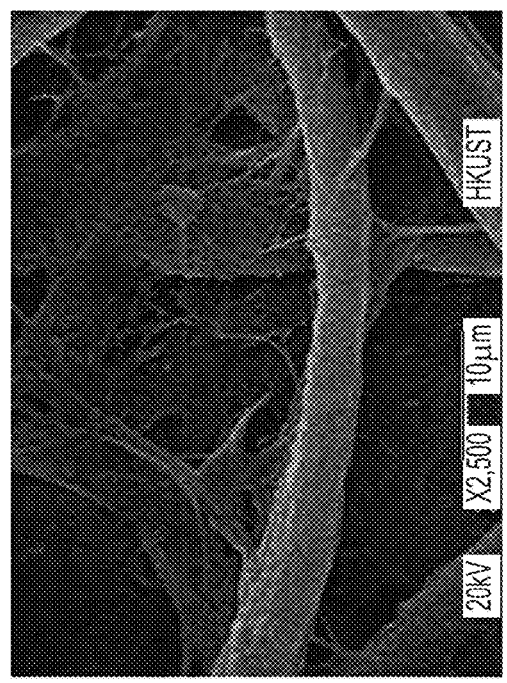
FIG. 3C is a SEM image of the cellulose paper with the adhesive interlayer formed thereon, shown at a magnification of ×2500.

FIG. 3A is a scanning electron microscope (SEM) image of a sample of cellulose paper. FIG. 3B is a SEM image of the cellulose paper with an adhesive interlayer formed thereon, shown at a magnification of ×200, and where the adhesive interlayer is formed from a metal oxide sol. FIG. 3C is a SEM image of the same cellulose paper with the adhesive interlayer formed thereon, shown at a magnification of ×2500. FIG. 3D is a SEM image of the cellulose paper with the ionic liquid-based coating coated thereon. As shown in FIG. 3A, the cellulose paper exhibits an interconnected porous structure made up of cellulose fibers. After applying the metal oxide sol on the cellulose paper, the cellulose fibers are covered with a uniform metal oxide interlayer (shown in FIGS. 3B and 3C). The metal oxide interlayer helps to disperse and adsorb ionic liquids on the cellulose fibers to form a uniform and stable ionic liquid coating. As shown in FIGS. 3B-3D, the metal oxide interlayer and the ionic liquid coating do not change the interconnected porous structure of the cellulose paper.

Figure 4A:
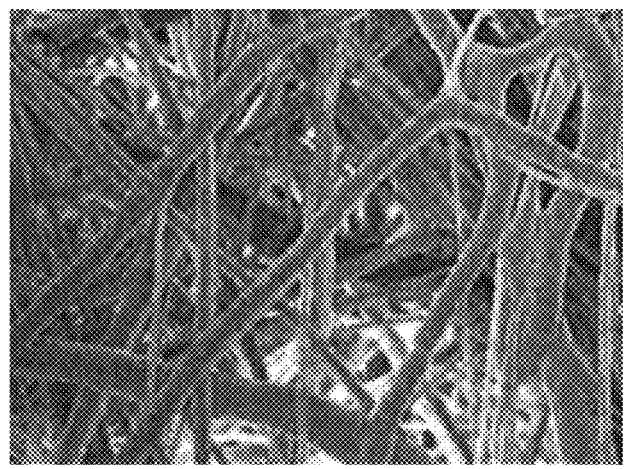
FIG. 4A is a SEM image of a high efficiency particulate air (HEPA) filter surface.
Figure 4B:
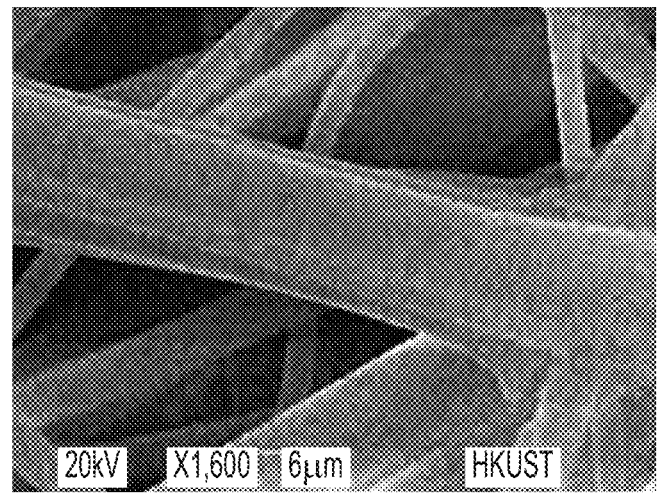
FIG. 4B is a SEM image of the HEPA filter surface with an adhesive interlayer formed thereon.
Figure 4C:
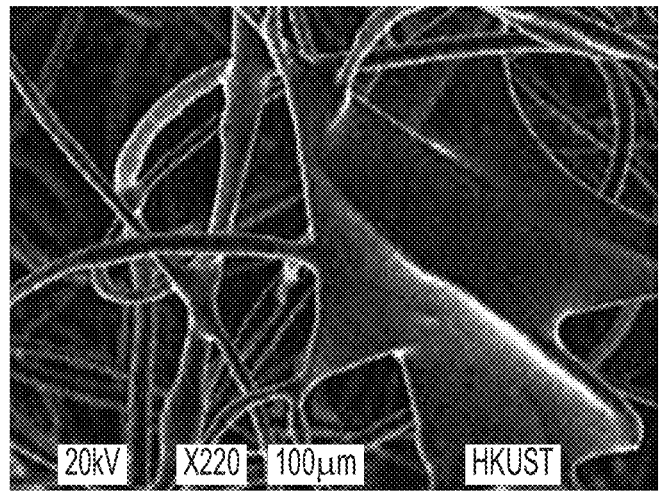
FIG. 4C is a SEM image of the HEPA filter surface with the ionic liquid-based coating coated thereon.
Figure 5:
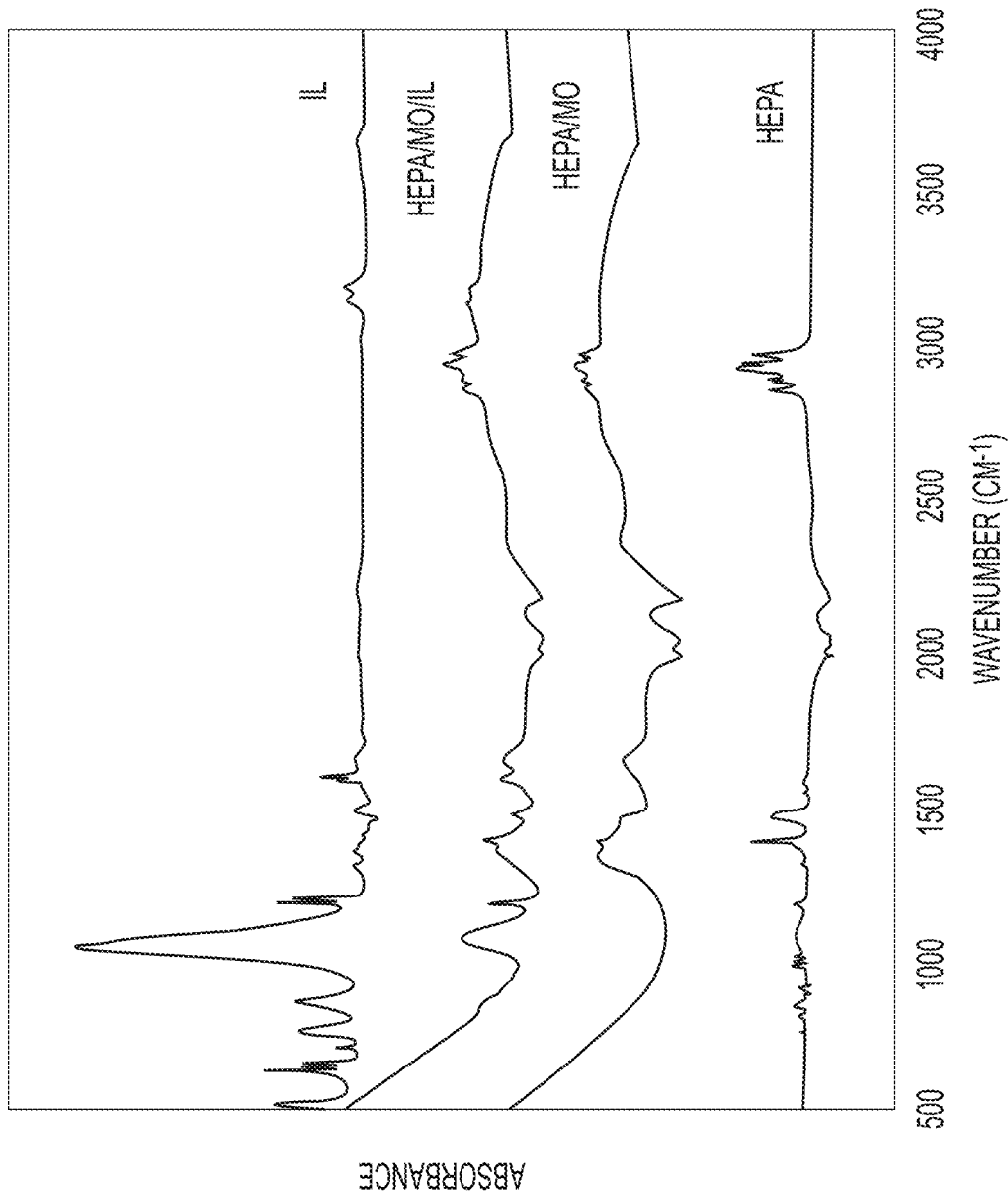
FIG. 5 is a graph comparing Fourier-transform infrared spectroscopy (FTIR) spectra of a HEPA filter, a pure ionic liquid sample (IL), the HEPA filter with a metal oxide interlayer formed thereon (HEPA/MO), and the HEPA filter with the ionic liquid-based coating (HEPA/MO/IL).
Figure 7A:
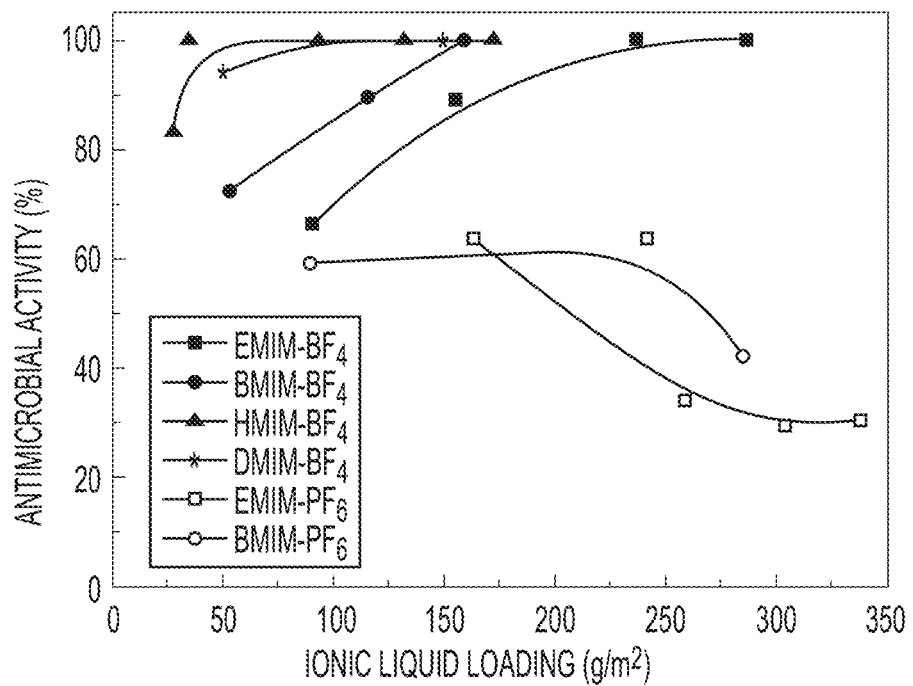
FIG. 7A is a graph comparing the antimicrobial activity against *E. coli*, as a function of ionic liquid loading, of HEPA filters with EMIM-$BF_4$, 1-butyl-3-methylimidazolium tetrafluoroborate (BMIM-B $F_4$), 1-hexyl-3-methylimidazolium tetrafluoroborate (HMIM-$BF_4$), 1-decyl-3-methylimidazolium tetrafluoroborate (DMIM-$BF_4$), 1-ethyl-3-methylimidazolium hexafluorophosphate (EMIM-$PF_6$), and 1-butyl-3-methylimidazolium hexafluorophosphate (BMIM-$PF_6$) ionic liquid coatings.
Figure 7B:
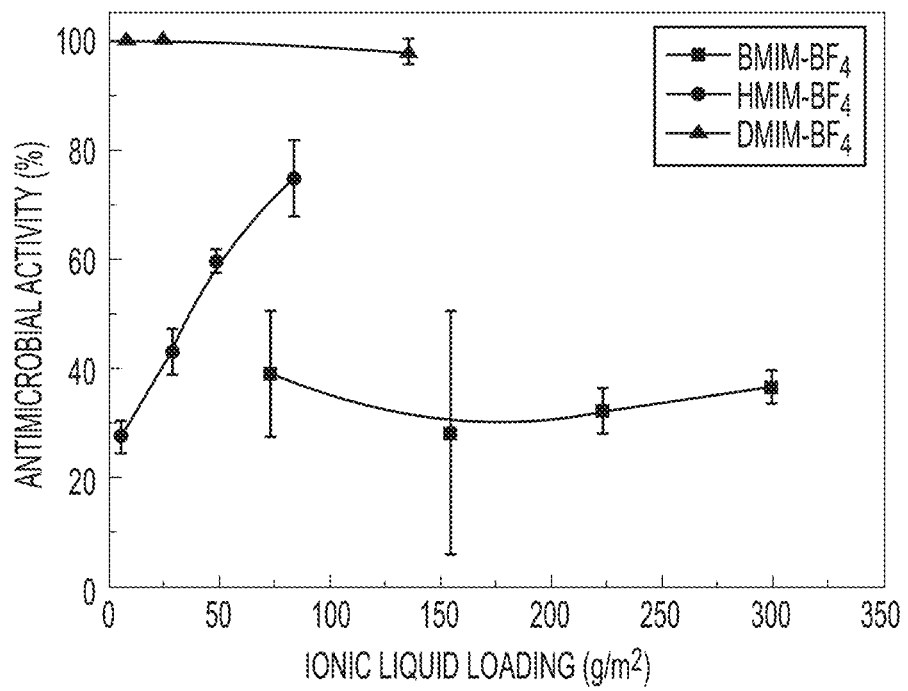
FIG. 7B is a graph comparing the antimicrobial activity against *S. aureus*, as a function of ionic liquid loading, of HEPA filters with BMIM-$BF_4$, HMIM-$BF_4$, and DMIM-$BF_4$ ionic liquid coatings.
Figure 8A:
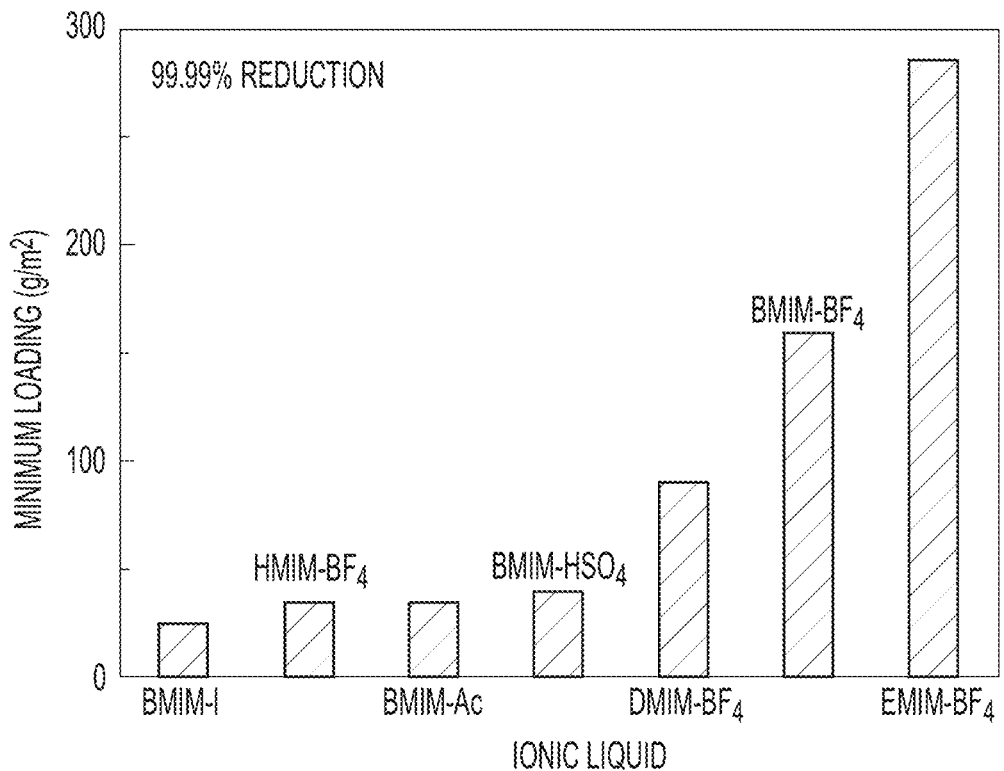
FIG. 8A is a bar graph comparing minimum ionic liquid loadings for a 99.99% reduction of $10^4$ CFU/ml *E. coli* on HEPA filters with EMIM-$BF_4$, BMIM-$BF_4$, HMIM-$BF_4$, DMIM-$BF_4$, BMIM-I, 1-butyl-3-methylimidazolium acetate (BMIM-Ac), and Brønsted acidic ionic liquid (1-butyl-3-methylimidazolium hydrogen sulfate, BMIM-$HSO_4$) ionic liquid coatings.
Figure 8B:
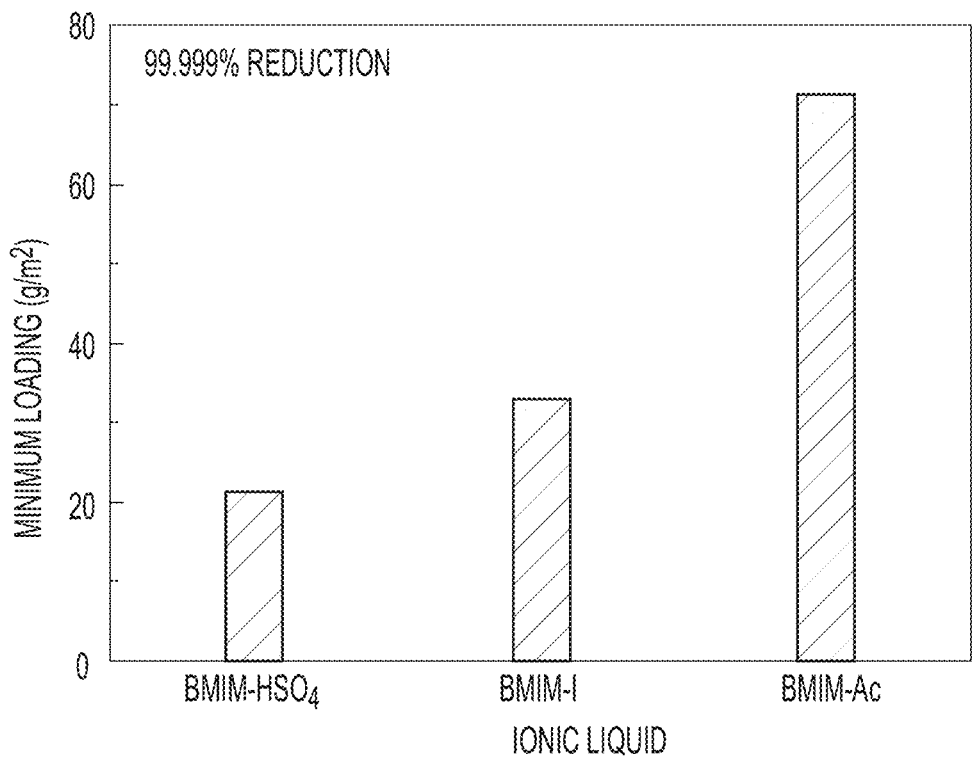
FIG. 8B is a bar graph comparing minimum ionic liquid loadings for a 99.999% reduction of $10^5$ CFU/ml *S. aureus* on HEPA filters with BMIM-I, BMIM-Ac and BMIM-$HSO_4$ ionic liquid coatings.
Figure 9A:
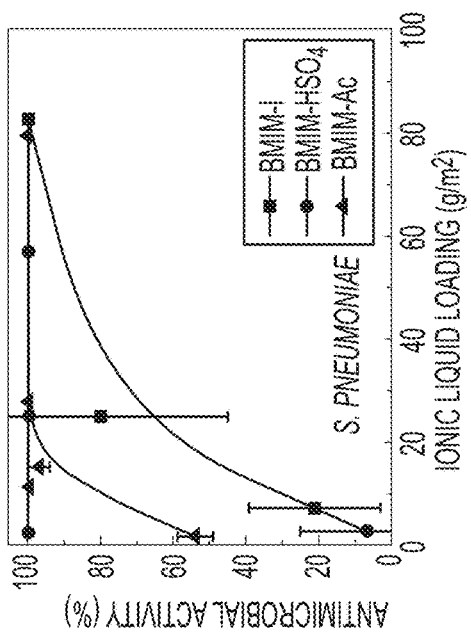
FIG. 9A is a graph comparing the antimicrobial activity against methicillin-resistant *S. aureus* (MRSA), as a function of ionic liquid loading, of HEPA filters with BMIM-I, BMIM-Ac, and BMIM-$HSO_4$ ionic liquid coatings.
Figure 9B:
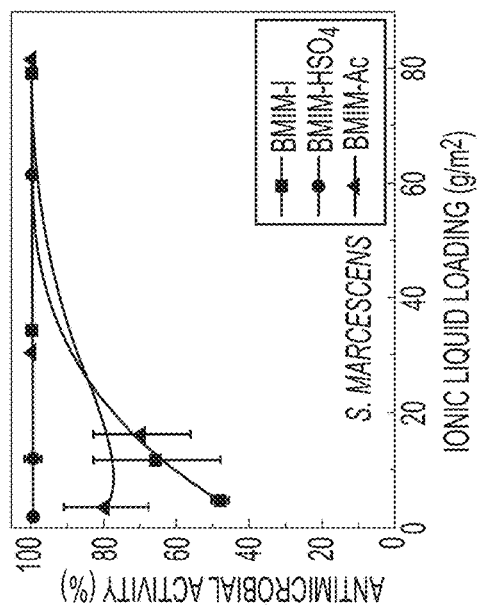
FIG. 9B is a graph comparing the antimicrobial activity against *S. pneumoniae*, as a function of ionic liquid loading, of HEPA filters with BMIM-I, BMIM-Ac, and BMIM-$HSO_4$ ionic liquid coatings.
Figure 9C:
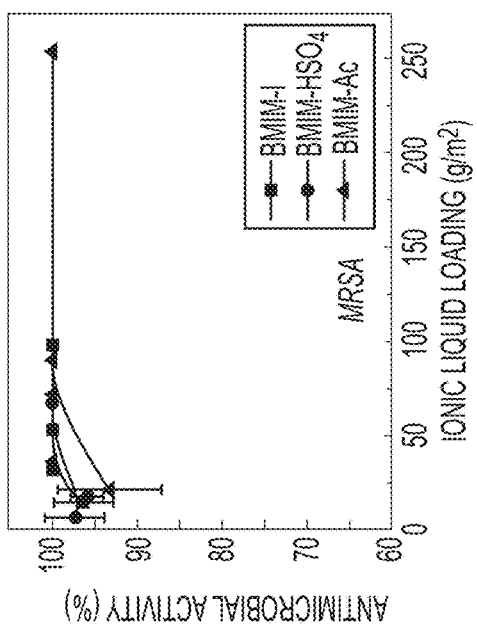
FIG. 9C is a graph comparing the antimicrobial activity against *L. pneumophila*, as a function of ionic liquid loading, of HEPA filters with BMIM-I, BMIM-Ac, and BMIM-$HSO_4$ ionic liquid coatings.
Figure 9D:
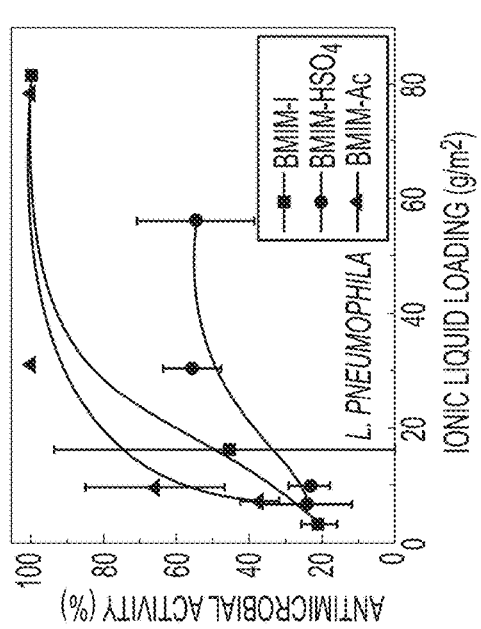
FIG. 9D is a graph comparing the antimicrobial activity against *S. marcescens*, as a function of ionic liquid loading, of HEPA filters with BMIM-I, BMIM-Ac, and BMIM-$HSO_4$ ionic liquid coatings.
Figure 10:
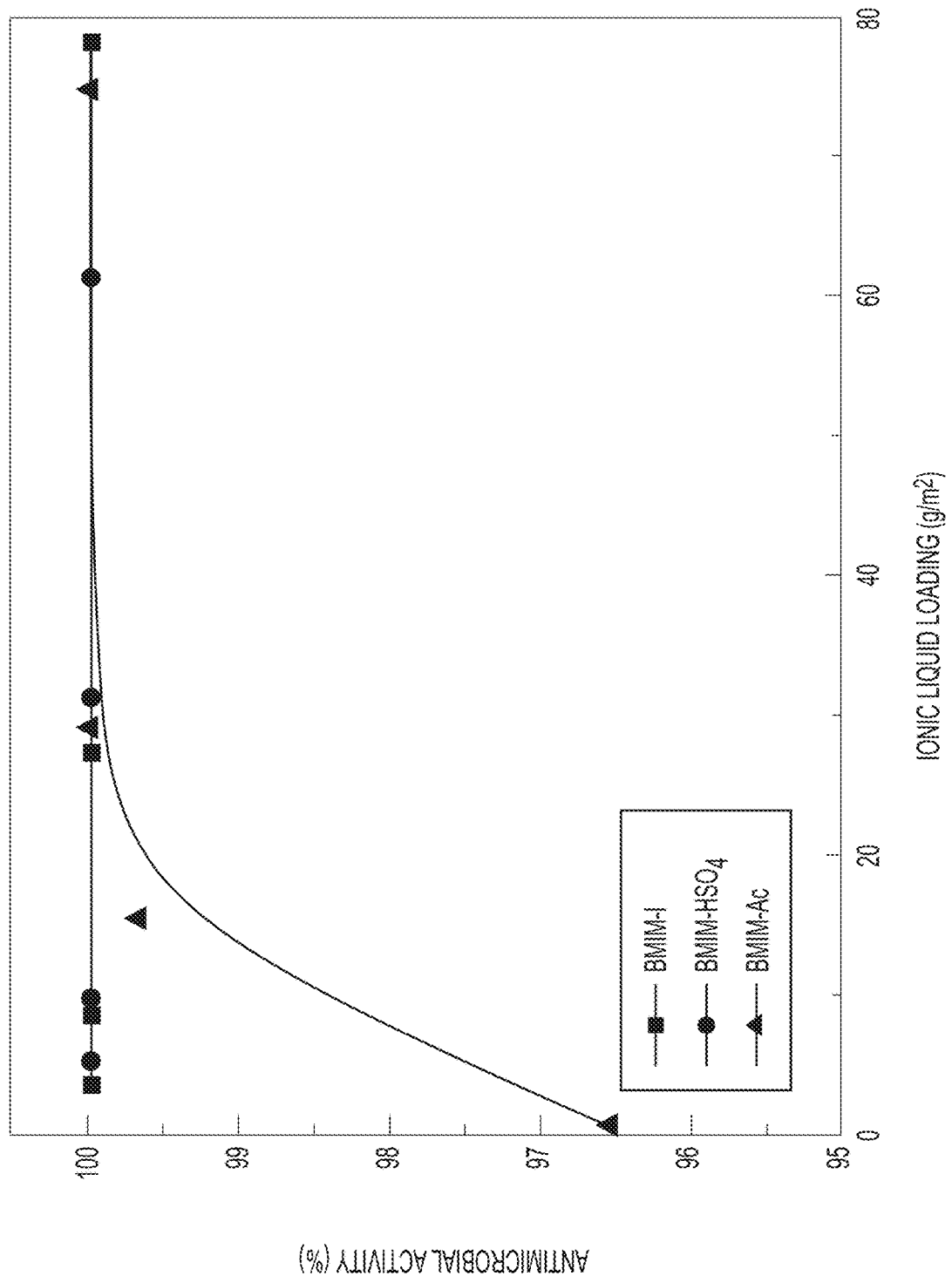
FIG. 10 is a graph comparing the antimicrobial activity against H1N1 influenza virus, as a function of ionic liquid loading, of HEPA filters with BMIM-I, BMIM-Ac, and BMIM-$HSO_4$ ionic liquid coatings.
Figure 11:
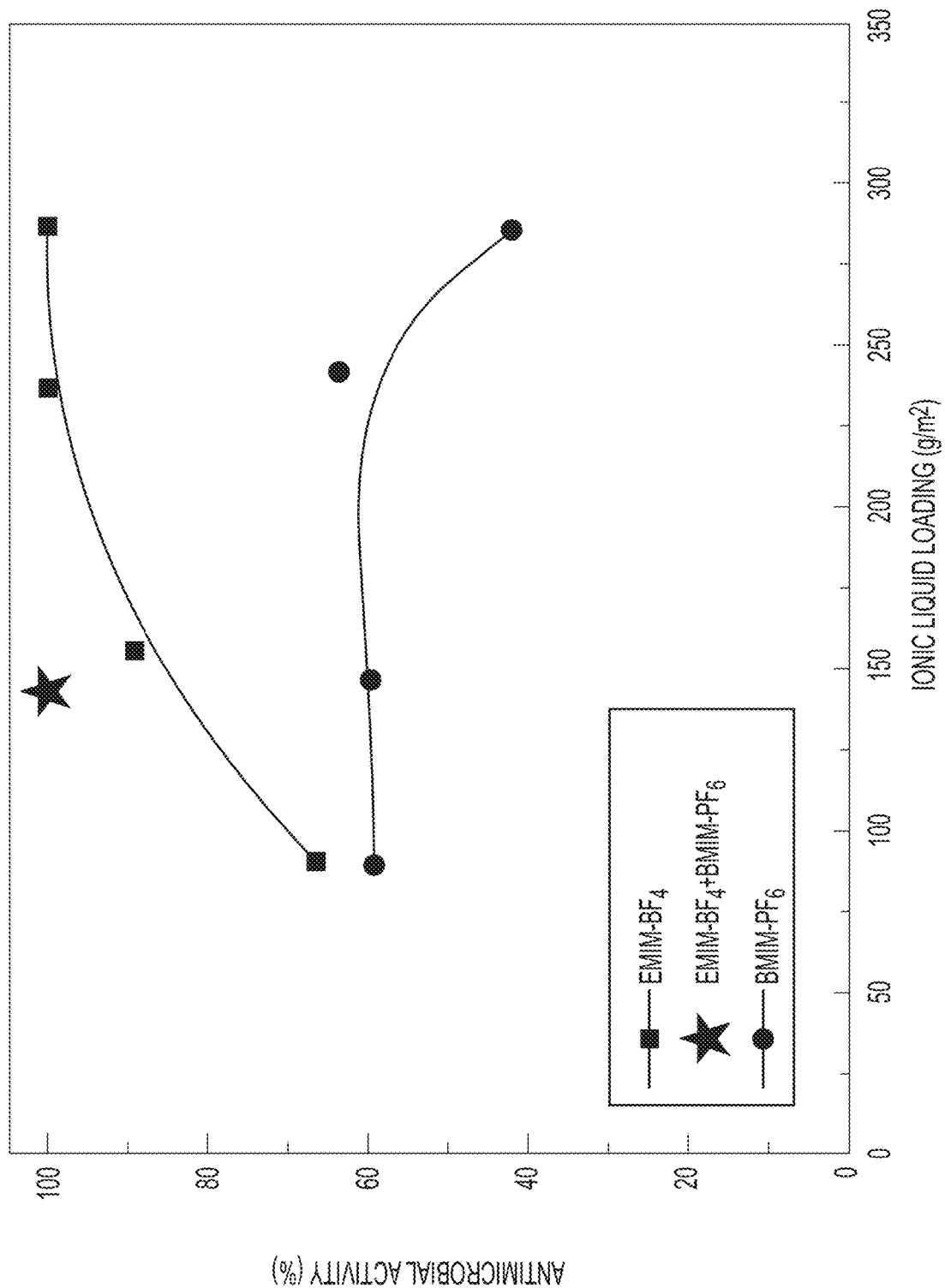
FIG. 11 is a graph comparing the antimicrobial activity against *E. coli*, as a function of ionic liquid loading, of HEPA filters with BMIM-$PF_6$, EMIM-$BF_4$, and combined EMIM-$BF_4$ and BMIM-$PF_6$ ionic liquid coatings.
Figure 12:
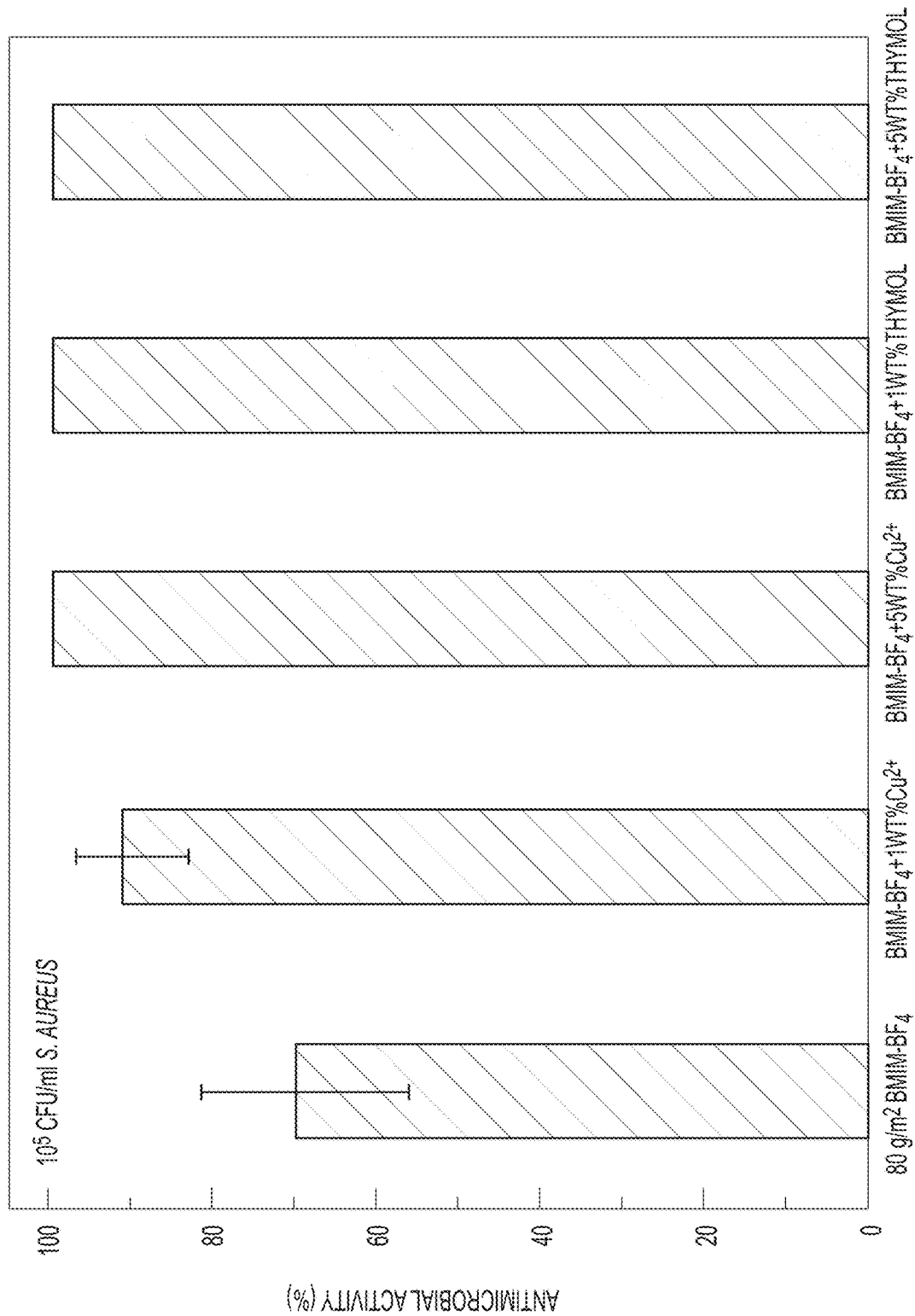
Figure 13:
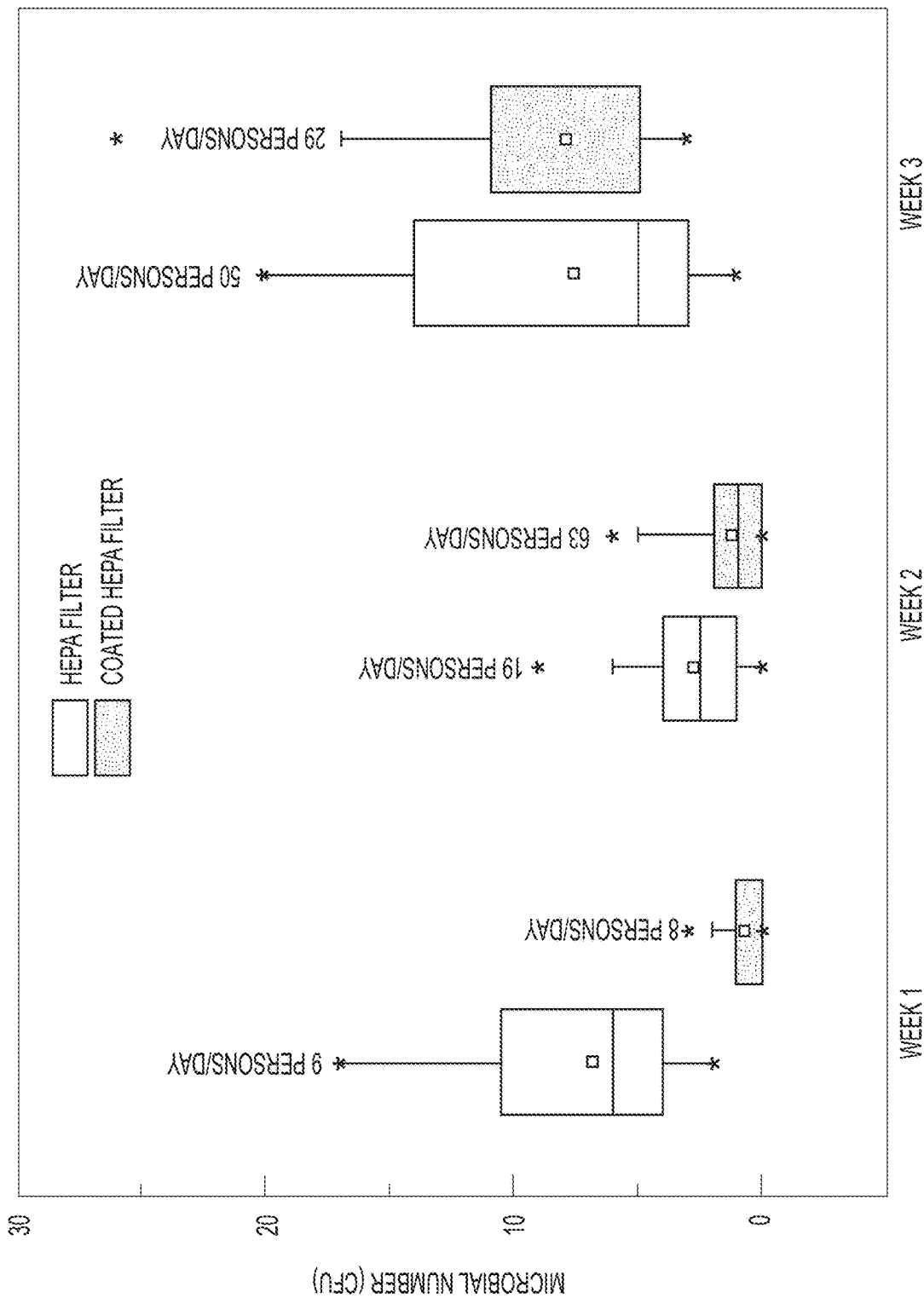
Figure 14:
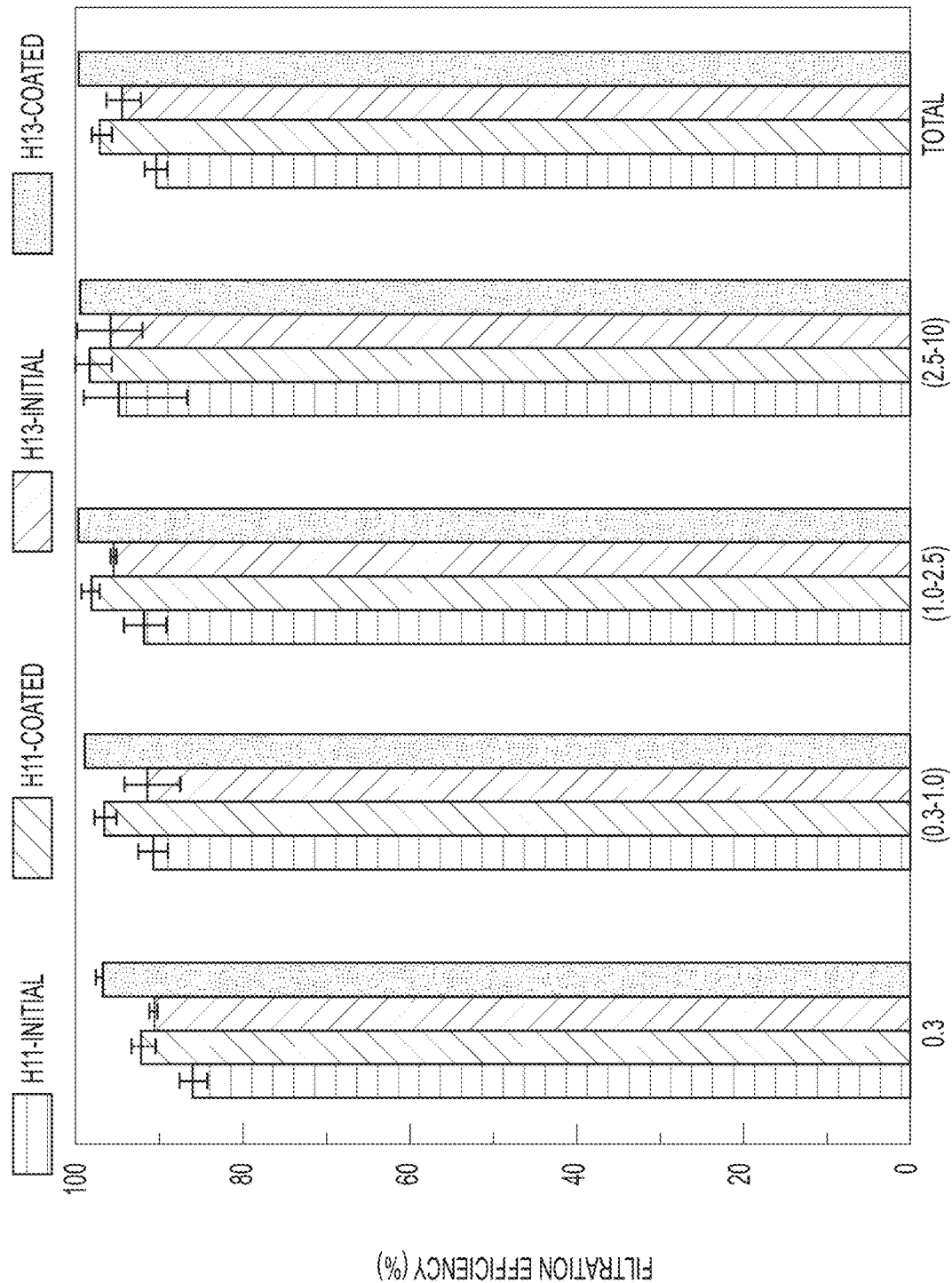

FIG. 4A is a SEM image of a high efficiency particulate air (HEPA) filter surface. FIG. 4B is a SEM image of the HEPA filter surface with an adhesive interlayer formed thereon, and FIG. 4C is a SEM image of the HEPA filter surface with the ionic liquid-based coating coated thereon. Compared with the initial HEPA filter shown in FIG. 4A, the polypropylene fibers within the functional layer of the HEPA filter are coated with a thin adhesive interlayer (shown in FIG. 4B). After further coating with ionic liquids and drying, the ionic liquids are immobilized on the adhesive interlayer to form a uniform ionic liquid-based coating (shown in FIG. 4C).

The ionic liquid has a poor surface wetting for the HEPA filter. By using additives and adhesives to adjust viscosity, surface wetting and adhesion, the ionic liquid-based coating can be formed on the HEPA filter. Using Fourier-transform infrared spectroscopy (FTIR), FIG. 5 compares the FTIR spectra of the initial HEPA filter, a pure ionic liquid sample (IL), the HEPA filter with a metal oxide interlayer formed thereon (HEPA/MO), and the HEPA filter with the ionic liquid-based coating (HEPA/MO/IL). In FIG. 5, it can be clearly seen the ionic liquid is successfully immobilized on the HEPA filter, based on the band at 1030 $cm^{-1}$, which corresponds to an asymmetric vibration of anion in the ionic liquid. By adjusting the adhesives and ionic liquids, textural structures and ionic liquid loading can be facilely manipulated to obtain a balance between flow resistance, antimicrobial activity and filtration efficiency. By optimizing the ratio of adhesive sol to ionic liquid and surface charges of sol particles, homogeneous composites of adhesives and ionic liquids can be formed, thus making the above one-step preparation of the ionic liquid-based coating possible.

FIG. 6A is a photograph illustrating an inhibition zone of distilled deionized (DDI) water for an *E. coli* sample. FIG. 6B is a photograph illustrating an inhibition zone of ethanol for an *E. coli* sample. FIG. 6C is a photograph illustrating an inhibition zone of 1-ethyl-3-methylimidazolium tetrafluoroborate (EMIM-$BF_4$) ionic liquid for an *E. coli* sample. FIG. 6D is a photograph illustrating inhibition zones of a HEPA filter sample with an EMIM-$BF_4$ ionic liquid coating for an *E. coli* sample. FIG. 6E is a photograph illustrating inhibition zones of a HEPA filter sample with a 1-butyl-3-methylimidazolium iodide (BMIM-I) ionic liquid coating for an *E. coli* sample. As shown in FIGS. 6A and 6B, there are no clear inhibition zones due to the microbe-friendly properties of DDI water and the evaporation of ethanol. The pure ionic liquid (EMIM-$BF_4$) of FIG. 6C exhibits an obvious inhibition for *E. coli* within the agar plate. In FIGS. 6D and 6E, larger inhibition zones appear with the increase of ionic liquid loading. The HEPA filter with the BMIM-I coating of FIG. 6E has a stronger inhibition ability for *E. coli* than that of the EMIM-$BF_4$ coating of FIG. 6D, which is comparable to a HEPA filter with a bleach coating.

FIG. 7A is a graph comparing the antimicrobial activity against $10^4$ CFU/ml *E. coli*, as a function of ionic liquid loading, of HEPA filters with EMIM-$BF_4$, 1-butyl-3-methylimidazolium tetrafluoroborate (BMIM-$BF_4$), 1-hexyl-3-methylimidazolium tetrafluoroborate (HMIM-$BF_4$), 1-decyl-3-methylimidazolium tetrafluoroborate (DMIM-$BF_4$), 1-ethyl-3-methylimidazolium hexafluorophosphate (EMIM-$PF_6$), and 1-butyl-3-methylimidazolium hexafluorophosphate (BMIM-$PF_6$) ionic liquid coatings. FIG. 7B is a graph comparing the antimicrobial activity against $10^5$ CFU/ml *S. aureus*, as a function of ionic liquid loading, of HEPA filters with BMIM-$BF_4$, HMIM-$BF_4$, and DMIM-$BF_4$ ionic liquid coatings. As can be seen, ionic liquids with longer alkyl chains exhibit better antimicrobial activities, which may be the result of the hydrophobic properties of longer alkyl chains. FIG. 8A is a bar graph comparing minimum ionic liquid loadings for a 99.99% reduction of $10^4$ CFU/ml *E. coli* on HEPA filters with EMIM-$BF_4$, BMIM-$BF_4$, HMIM-$BF_4$, DMIM-$BF_4$, BMIM-I, 1-butyl-3-methylimidazolium acetate (BMIM-Ac), and Brønsted acidic ionic liquid (1-butyl-3-methylimidazolium hydrogen sulfate, BMIM-$HSO_4$) ionic liquid coatings. Anions of $I^-$, $HSO_4^-$ and $CH_3COO^-$ have higher antimicrobial activities against *E. coli* (i.e., lower minimum loading of ionic liquids on HEPA filters) than $BF_4^-$. FIG. 8B is a bar graph comparing minimum ionic liquid loadings for a 99.999% reduction of $10^5$ CFU/ml *S. aureus* on HEPA filters with BMIM-I, BMIM-Ac and BMIM-$HSO_4$ ionic liquid coatings.

FIG. 9A is a graph comparing the antimicrobial activity against $10^5$ CFU/ml methicillin-resistant *S. aureus* (MRSA), as a function of ionic liquid loading, of HEPA filters with BMIM-I, BMIM-Ac, and BMIM-$HSO_4$ ionic liquid coatings. FIG. 9B is a graph comparing the antimicrobial activity against $10^7$ CFU/ml *S. pneumoniae*, as a function of ionic liquid loading, of HEPA filters with BMIM-I, BMIM-Ac, and BMIM-$HSO_4$ ionic liquid coatings. FIG. 9C is a graph comparing the antimicrobial activity against $10^5$ CFU/ml *L. pneumophila*, as a function of ionic liquid loading, of HEPA filters with BMIM-I, BMIM-Ac, and BMIM-$HSO_4$ ionic liquid coatings. FIG. 9D is a graph comparing the antimicrobial activity against $10^6$ CFU/ml *S. marcescens*, as a function of ionic liquid loading, of HEPA filters with BMIM-I, BMIM-Ac, and BMIM-$HSO_4$ ionic liquid coatings. FIGS. 9A-9D show that the coatings exhibit excellent antimicrobial activities for a variety of different microbes.

FIG. 10 is a graph comparing the antimicrobial activity against $10^8$ PFU/ml H1N1 influenza virus as a function of ionic liquid loading, of HEPA filters with BMIM-I, BMIM-Ac, and BMIM-$HSO_4$ ionic liquid coatings. As shown, the ionic liquid-based coating can completely inactivate the virus when the ionic liquid loading reaches 30 $g/m^2$. The HEPA filter with BMIM-I coating can reduce 99.97% of the H1N1 influenza virus, even when the ionic liquid loading is as low as 3.5 $g/m^2$. These results verify that HEPA filters with ionic liquid-based coatings have broad-spectrum antimicrobial activities.

FIG. 11 is a graph comparing the antimicrobial activity against $10^4$ CFU/ml *E. coli* as a function of ionic liquid loading, of HEPA filters with BMIM-$PF_6$, EMIM-$BF_4$, and combined EMIM-$BF_4$ and BMIM-$PF_6$ ionic liquid coatings. As shown, the HEPA filter with the EMIM-$BF_4$ and BMIM-$PF_6$ mixed coating exhibits much higher antimicrobial activities than those with the single EMIM-$BF_4$ coating and the single BMIM-$PF_6$ coating. FIG. 12 shows the synergistic effects of ionic liquids and additives on antimicrobial activities of HEPA filters with BMIM-$BF_4$ ionic liquid-based coatings. The addition of other disinfectants, such as metal ions and essential oils, can remarkably improve antimicrobial activities of the HEPA filters with ionic liquid-based coatings. The HEPA filter with the BMIM-$BF_4$ coating can reduce only 70% of *S. aureus* after 10 minutes of contact. After a small amount of $Cu^{2+}$ and thymol were added into the ionic liquid coating, the HEPA filters with the mixed coatings (5 wt % $Cu^{2+}$, 1 wt % thymol, 5 wt % thymol) can reduce 99.999% of *S. aureus* after 10 minutes of contact.

Commercial HEPA filters and HEPA filters with the ionic liquid-based coatings were assembled into air purifiers to carry out three-week field tests in standard classrooms and wet labs of a university. FIG. 13 compares the results of the field tests. Microbial number accumulated on the HEPA filters with the ionic liquid-based coatings is only 9% of that on commercial HEPA filters in the first week. Even under the conditions of higher occupants (63 persons/day vs. 19 persons/day) in the second week, microbial number accumulated on the HEPA filters with the ionic liquid-based coatings is still lower than that on commercial HEPA filters.

FIG. 14 compares filtration efficiencies for particulate matter (i.e., sodium chloride aerosol) of initial H11 and H13

HEPA filters, and H11 and H13 HEPA filters with BMIM-I coatings. Generally, both the H11 and H13 HEPA filters with BMIM-I coatings exhibit enhanced filtration efficiencies in all particle size distribution ranges (below 0.3 µm; from 0.3 µm to 1.0 µm; from 1.0 µm to 2.5 µm; from 2.5 µm to 10 µm; from 0.02 µm to 1.0 µm) without increased flow resistance (0.2 kPa pressure drop under 2 m/s air velocity). It should be noted that the H11 HEPA filter with the BMIM-I coating has a higher filtration efficiency than the H13 HEPA filter, which means that the ionic liquid-based coating effectively upgrades the HEPA filter class. The charge, high viscosity and excellent sorption capacity of ionic liquids are believed to contribute to the improvement of filtration efficiency.

Figure 15:
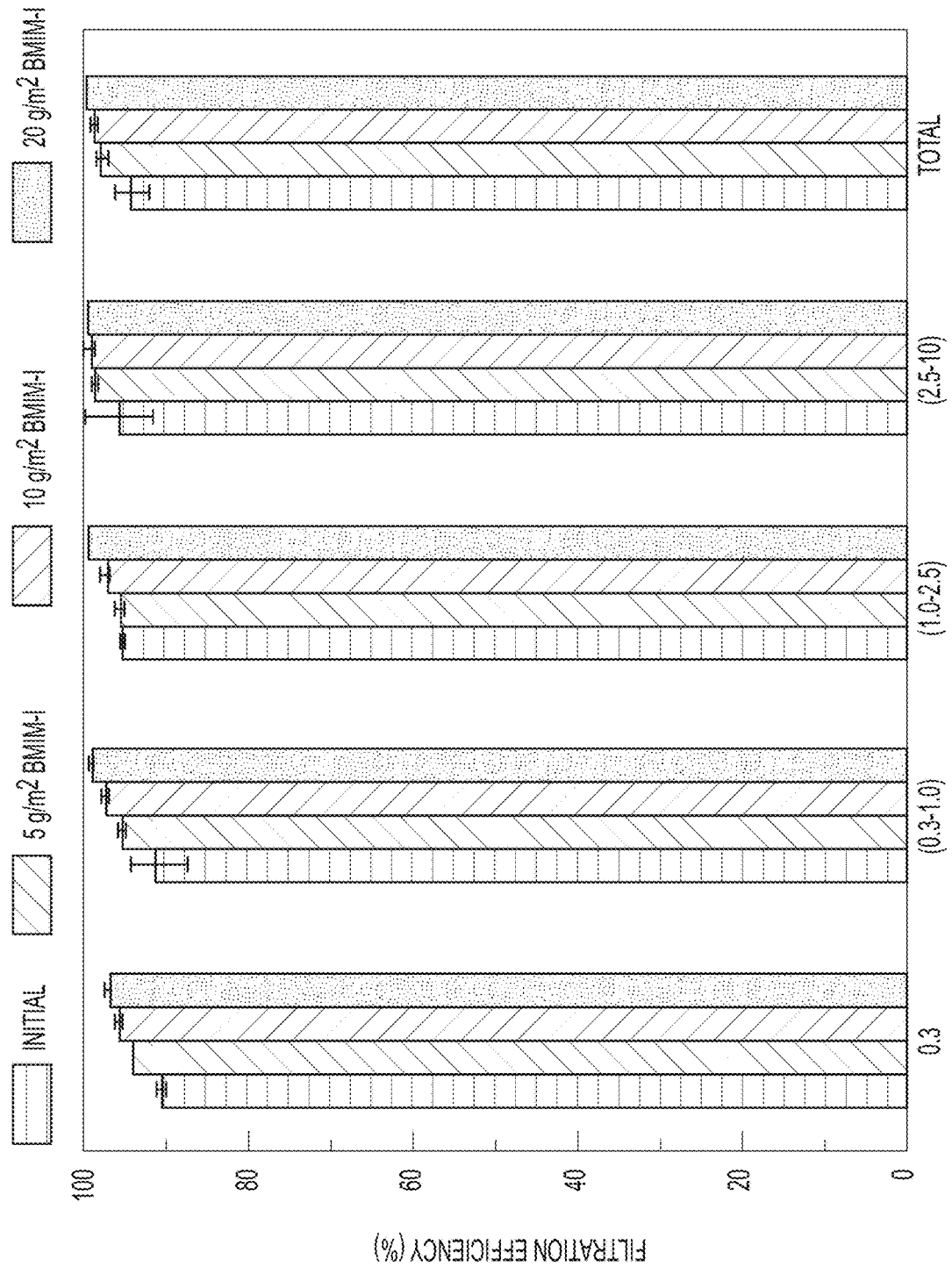
Figure 16:
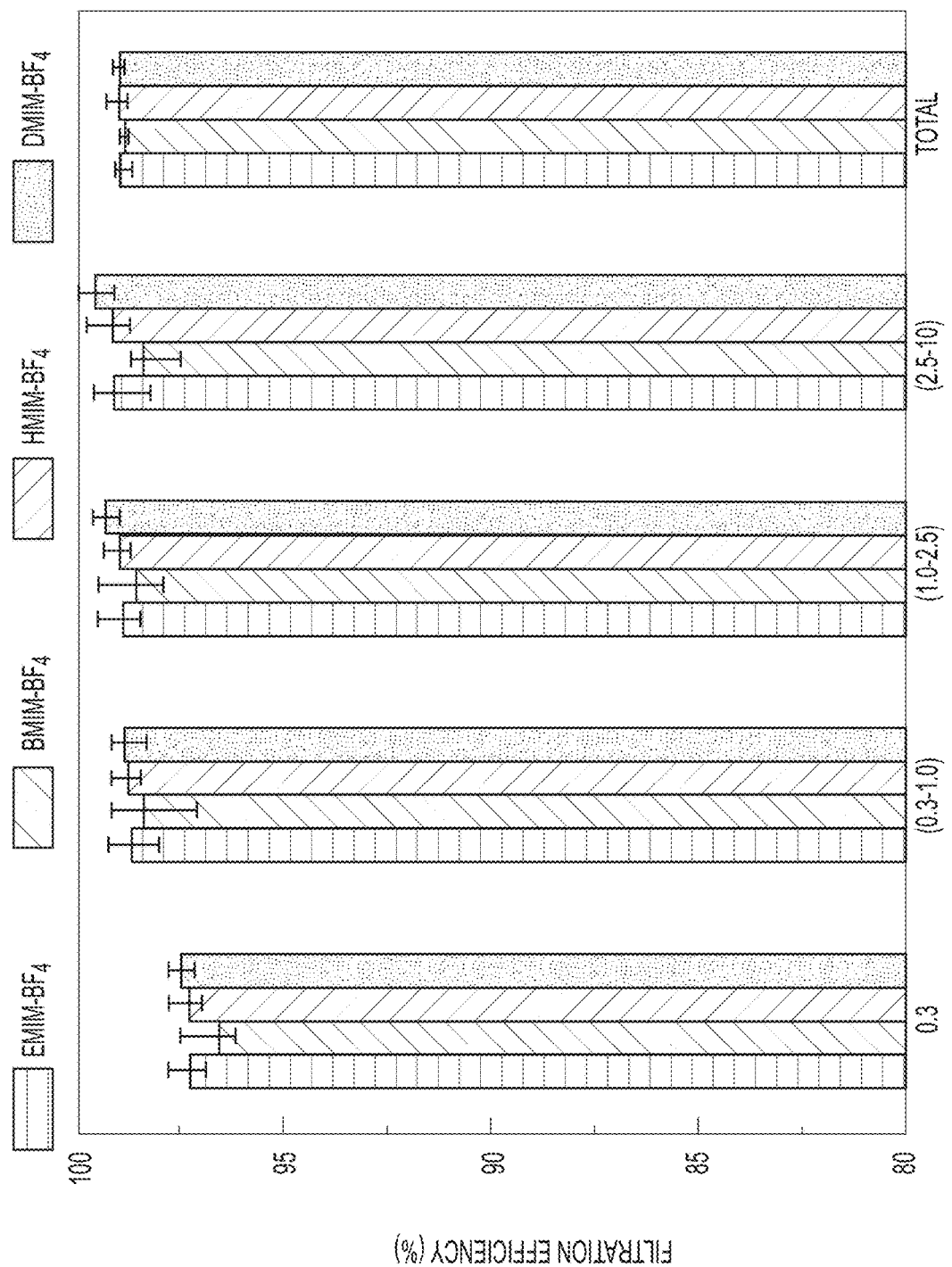
Figure 17:
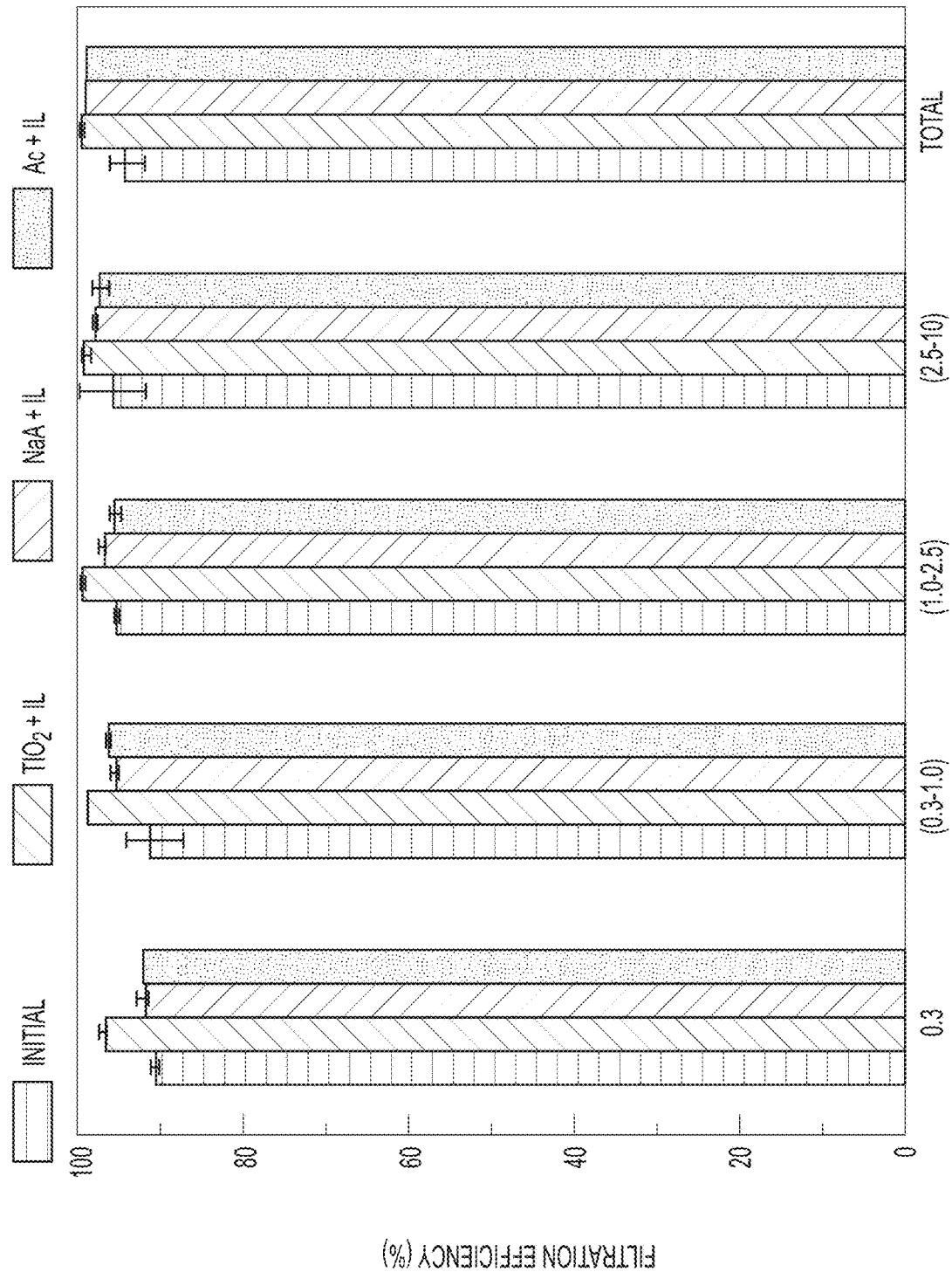

FIG. 15 compares filtration efficiencies for particulate matter of an initial H13 HEPA filter, and H13 HEPA filters with different loadings of the ionic liquid-based coating. With the increase of ionic liquid loading from 0 (i.e., initial H13 HEPA filter) to 20 g/m², filtration efficiencies of the corresponding HEPA filters in all particle size distribution ranges are gradually elevated. FIG. 16 compares filtration efficiencies for particulate matter of H13 HEPA filters with different ionic liquid-based coatings. The H13 HEPA filter with $DMIM-BF_4$ coating, whose ionic liquid has the longest alkyl chain, exhibits the highest filtration efficiencies, while $BMIM-BF_4$ (with a moderate alkyl chain length) gives the lowest filtration efficiencies. With the increase of alkyl chain length, ionic liquids exhibit higher viscosity accompanied by lower hydrophilicity. Viscosity dominates filtration efficiency, and high viscosity remarkably enhances filtration efficiency. For a water-soluble sodium chloride aerosol, the high hydrophilicity also improves filtration efficiency. FIG. 17 compares filtration efficiencies for particulate matter of the initial H13 HEPA filter and H13 HEPA filters with ionic liquid-based coatings prepared using different adhesives. The H13 HEPA filter with the ionic liquid-based coating using $TiO_2$ sol as the adhesive exhibits the highest filtration efficiencies, while those using NaA zeolite sol and activated carbon sol as adhesives have comparable filtration efficiencies.

Figure 18:
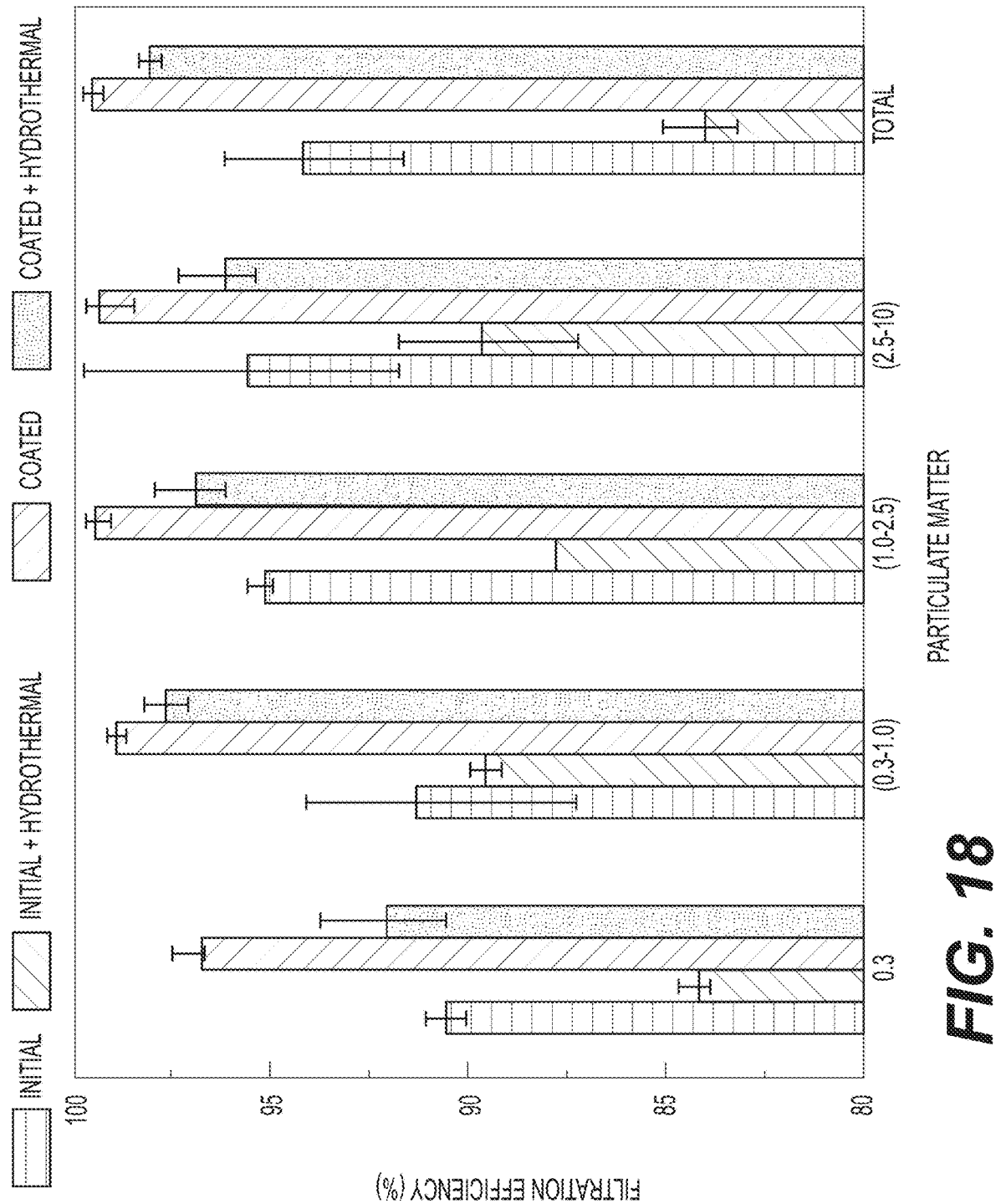

An accelerated ageing test was designed to carry out hydrothermal treatment for air filters under harsh conditions (90° C. and 85% relative humidity) in a humidity chamber for 48 hours to study the stability of the ionic liquid-based coatings. As shown in FIG. 18, the total filtration efficiency of H13 HEPA filters after hydrothermal treatment decreases to 89% of the initial value, while the H13 HEPA filter with the ionic liquid-based coating after hydrothermal treatment maintains above 98% of the initial filtration efficiency. This result indicates that the ionic liquid-based coatings are even more stable than the HEPA filter, thus HEPA filters with the ionic liquid-based coatings may have prolonged lifespans compared to initial uncoated HEPA filters.

Figure 19:
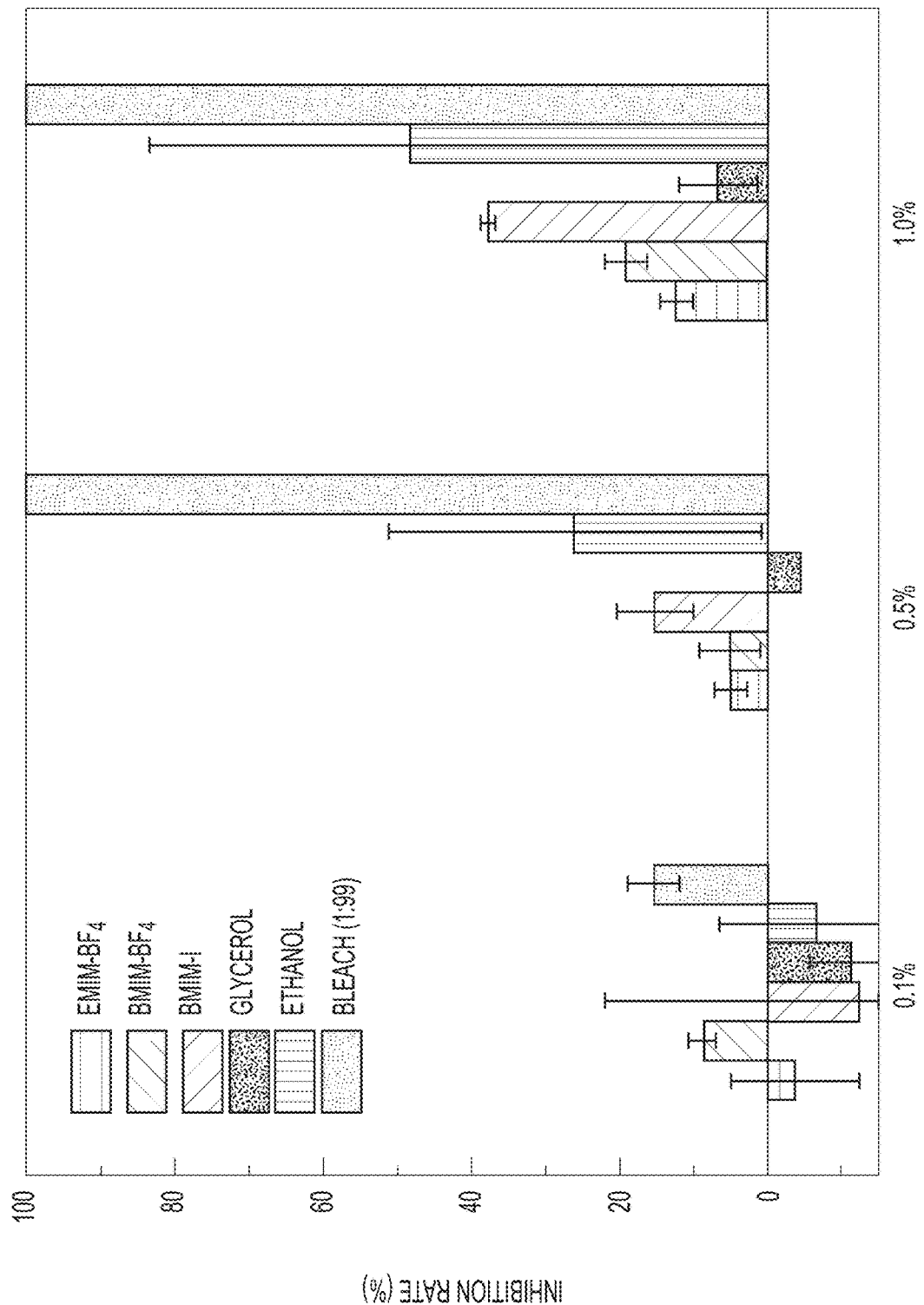

Ionic liquids have been proven to be green and safe solvents. Since ionic liquid-based coatings exhibit potential applications in air disinfection and purification, cytotoxicies of the ionic liquids for A549 lung epithelial cells were assessed, as shown in FIG. 19. $EMIM-BF_4$ has the lowest cytotoxicity among the three ionic liquids. These ionic liquids exhibit very low cytotoxicities, which are between glycerol as a non-toxic cryoprotective agent and ethanol as the most common solvent, even when their concentrations reach 1.0 wt % in the cell culture media. Their cytotoxicities are significantly lower than that of bleach (1:99) as a common disinfectant. It should be noted that the ionic liquid-based coating is almost impossible to be released into the air, since the vapor pressure of most ionic liquids is on the order of $10^{-10}$ Pa at room temperature. The ionic liquid-based coating is highly safe for large-scale applications.

Example 1: Silica Sol (Water-Soluble Silica Source)

Sodium silicate solution (2.9 g) was diluted with DDI water to 40 ml, followed by the addition of diluted nitric acid (1 mol/l, 15.6 ml) under vigorous stirring to obtain an acidic silica sol with a pH value of 1.

Example 2: Silica Sol (Water-Soluble Silica Source)

Sodium silicate solution (2.9 g) was diluted with DDI water to 40 ml, followed by the addition of diluted nitric acid (1 mol/l, 8.2 ml) under vigorous stirring to obtain an acidic silica sol with a pH value of 4.

Example 3: Silica Sol (Silicon Alkoxide)

Diluted nitric acid (0.14 mol/l, 9.6 ml) was added to tetraethyl orthosilicate (30 ml) under stirring, followed by heating at 50° C. for 3 hours to obtain a clear silica sol.

Example 4: Colloidal Silica Sol

Commercial colloidal silica sol (Ludox® AS-40) was diluted with DDI water to form a colloidal silica sol with a concentration range of 5-20 wt %.

Example 5: Colloidal Alumina Sol

Commercial pseudoboehmite powder (3.4 g) was dispersed in DDI water (47 ml) under vigorous stirring, followed by heating at 80° C. and adding diluted nitric acid (1.6 mol/l, 1.8 ml). The obtained mixture was further stirred at 80° C. for 6 hours to obtain a clear alumina sol (1 mol/l).

Example 6: Colloidal Titania Sol

Titanium isopropoxide (10 ml) was dissolved in isopropanol (23.6 ml), followed by adding $HNO_3$ (2 mol/l, 3.4 ml) and DDI water (31.4 ml) under vigorous stirring to obtain an opaque suspension. The suspension was further stirred at 80° C. to evaporate isopropanol and peptizing titania precipitate, followed by cooling down to room temperature and stirring overnight to obtain a clear titania sol (1 mol/l).

Example 7: Silica-Alumina Sol

Tetraethyl orthosilicate (22 ml) was added to acidic boehmite sol (0.2 mol/l, 50 ml) under vigorous stirring, followed by stirring for 24 hours at room temperature to form a clear silica-alumina sol with a Si/Al ratio of 10.

Example 8: Silica-Titania Sol

Tetraethyl orthosilicate (22 ml) was added to titania sol (1 mol/l, 50 ml) under vigorous stirring, followed by stirring for 24 hours at room temperature to form a clear silica-titania sol with a Si/Ti ratio of 2.

Example 9: Carbonaceous Sol

Carbonaceous particles were prepared from activated carbon or flake graphite oxidized by concentrated $H_2SO_4$, followed by dispersion in DDI water to form a carbonaceous sol. In a typical synthesis, flake graphite (1 g) was added slowly into concentrated $H_2SO_4$ (50 ml) at 250° C. for 18 hours. The suspension was cooled down to room temperature, washed with DDI water, filtrated and further dispersed in DDI water.

Example 10: Graphene Oxide Sol

Graphene oxide nanosheets, prepared from flake graphite by a modified Hummers method, were dispersed in DDI water to form a graphene oxide sol with a concentration range of 1-10 mg/ml.

Example 11: Zeolite Sol

Zeolite sol was prepared by using acids or bases to treat commercial zeolites. In a typical synthesis, NaA zeolite (1.5 g) was treated with HCl solution (5 mol/l, 8.5 g) for 30 minutes to obtain a NaA zeolite sol. In another typical synthesis, HBeta zeolite (Si/Al=37.5, g) was treated with NaOH solution (5 mol/l, 19 g) for 30 minutes to obtain a HBeta zeolite sol.

Example 12: Zeolite-Metal Oxide Sol

Zeolite sol prepared by the method of Example 11 and metal oxide sol prepared by the methods of Examples 1-8 were mixed under vigorous stirring to form zeolite-metal oxide sols.

Example 13: Ionic Liquid Solution (Water as Viscosity Modifier)

DDI water can be used as viscosity modifier to lower the viscosities of ionic liquids for coating preparation. EMIM-$BF_4$ was dissolved in DDI water to form ionic liquid solutions with a concentration range of 0.1-2.0 wt %. BMIM-$BF_4$ was dissolved in DDI water to form ionic liquid solutions with a concentration range of 0.1-2.0 wt %. 1-butyl-3-methylimidazolium hydrogen sulfate (BMIM-$HSO_4$) was dissolved in DDI water to form ionic liquid solutions with a concentration range of 0.1-2.0 wt %. BMIM-I was dissolved in DDI water to form ionic liquid solutions with a concentration range of 0.1-2.5 wt %. 1-butyl-3-methylimidazolium trifluoromethanesulfonate (BMIM-TFMS) was dissolved in DDI water to form ionic liquid solutions with a concentration range of 0.1-3.0 wt %.

Example 14: Ionic Liquid Solution (Alcohol as Viscosity Modifier)

Alcohols can be used as viscosity modifiers to lower the viscosities of ionic liquids for coating preparation. In a typical synthesis, BMIM-I was dissolved in isopropanol form ionic liquid solutions with a concentration range of 0.1-1 wt %.

Example 15: Ionic Liquid Solution (Acetonitrile as Viscosity Modifier)

Acetonitrile can be used as a viscosity modifier to lower the viscosities of ionic liquids for coating preparation. In a typical synthesis, EMIM-$BF_4$ was dissolved in acetonitrile to form ionic liquid solutions with a concentration range of 0.1-1 wt %.

Example 16: Ionic Liquid Solution (Tetrahydrofuran as Viscosity Modifier)

Tetrahydrofuran can be used as a viscosity modifier to lower the viscosities of ionic liquids for coating preparation. In a typical synthesis, BMIM-$PF_6$ was dissolved in tetrahydrofuran to form ionic liquid solutions with a concentration range of 0.1-0.5 wt %.

Example 17: Ionic Liquid and Metal Ion

Metal ions can be used as another type of disinfectant to improve antimicrobial activity of ionic liquid coatings. Ionic liquid solutions as described in Examples 13-15 were mixed with aqueous solutions of metal ions, including $Cu^{2+}$, $Zn^{2+}$ and $Ag^+$. The final concentration of metal ions ranges from 10 ppm to 2000 ppm.

Example 18: Ionic Liquid and Phytochemical

Phytochemicals, including essential oils or their active components, can be used as another type of disinfectant to improve antimicrobial activity of the ionic liquid coating. Ionic liquid solutions as described in Examples 14-16 were mixed with essential oils or their active components, including thyme oil or thymol, tea tree oil or terpinen-4-oil, and cinnamon oil or cinnamaldehyde.

Example 19: Ionic Liquid and Fragrance

Fragrances or scents can be added to ionic liquid solutions to prepare ionic liquid coatings with pleasant odors. Ionic liquid solutions as described in Examples 14-16 were mixed with aroma compounds, including aliphatic hydrocarbon, aldehyde, alcohol, ester, and aromatic compounds.

Example 20: Ionic Liquid and Adhesive

Ionic liquids and adhesives can be mixed to form homogeneous composites without any precipitation for the preparation of the ionic liquid coating by the single-step process described above. Ionic liquid solutions as described in Examples 13-15, or the composites of ionic liquids described in Examples 17-19, were mixed with the adhesives described in Examples 1-8 to prepare composites of ionic liquids and adhesives.

Example 21: Adhesive Interlayer

Adhesives as described in Examples 1-8 can be applied on porous or nonporous substrates to form adhesive interlayers. In a typical preparation on porous substrates, adhesives were distributed uniformly on the functional layer of HEPA filters through a spray nozzle, followed by drying at 40° C. overnight. In a typical preparation on a nonporous substrate, adhesives were brushed uniformly on glass slides, followed by drying at 40° C. overnight.

Example 22: Antimicrobial Coating (Two-Step Process)

Ionic liquids can be applied on porous or nonporous substrates with an adhesive interlayer to form ionic liquid-based antimicrobial coatings. Ionic liquid solutions as described in Examples 13-16, or the composites of ionic liquids and additives described in Examples 17-19, were distributed uniformly on adhesive interlayers of porous or nonporous substrates through a spray nozzle, followed by drying at 40° C. overnight.

Example 23: Antimicrobial Coating (One-Step Process)

The composites of ionic liquids and adhesives as described in Example 20 can be directly applied on porous or nonporous substrates to form ionic liquid-based antimicrobial coatings. In a typical preparation on porous substrates, the composites of ionic liquids and adhesives were distributed uniformly on the functional layer of HEPA filters through a spray nozzle, followed by drying at 40° C. overnight. In a typical preparation on a nonporous substrate, the composites of ionic liquids and adhesives were brushed uniformly on glass slides, followed by drying at 40° C. overnight.

Example 24: Inhibition Zone

A bacterial suspension (0.1 ml) was spread onto tryptone soya agar plates. HEPA filters with ionic liquid coatings were cut into small pieces. They were then placed on the center of plates spread by bacteria. The plates were incubated at room temperature for 48 hours.

Example 25: Antimicrobial Activity

A bacterial suspension (0.1 ml) was spread evenly on the substrates without/with ionic liquid coatings for 10 minutes. The substrates were then immersed into a culture tube containing neutralizer (20 ml) for 30 minutes to stabilize and wash off the still surviving bacteria from the surface. The neutralizer solutions collecting bacteria were spread onto tryptone soya agar plates for viable culturing. The plates were incubated at 37° C. for 24 hours. The viable bacteria were enumerated from formed colony number.

A virus suspension (0.1 ml) was spread evenly on the substrates without/with ionic liquid coatings for 10 minutes. The substrates were then immersed into a plate containing neutralizer (6 ml) for another 10 minutes. Then, all liquid inside the plate was taken and diluted to different concentrations, followed by addition into a 96-well microplate with single-layer grown Madin-Darby Canine Kidney cells. The 96-well microplate was placed into a 5% $CO_2$ incubator at 37° C. for 2 hours. The supernatant was taken and further incubated for 48 hours. Virus concentration was expressed as the 50% tissue culture infective dose ($TCID_{50}$).

Example 26: Field Test

Commercial HEPA filters and HEPA filters with ionic liquid-based coatings (1 $g/m^2$ of $TiO_2$ interlayer and 20 $g/m^2$ of BMIM-I coating) were assembled into air purifiers for field tests. Three standard classrooms and wet labs of a university were selected to carry out a three-week field test. Infrared people counters were used to record occupant numbers, and microbial samples were collected from the commercial HEPA filters and the HEPA filters with ionic liquid-based coatings.

Example 27: Filtration Efficiency

Airborne sodium chloride particles (about $10^5$ particles/$cm^3$) generated from a Model 8026 particle generator, manufactured by TSI® Incorporated, were driven by a Sensdar® ventilation fan from the generator side to the filtration side through air filters (effective area: 5 cm in diameter). A P-Trak 8525 particle counter, manufactured by TSI® Incorporated, and a particle counter sold by Shenzhen Korno Import & Export Co. were used to measure airborne particle concentrations in different particle size distribution ranges, respectively. Filtration efficiencies were calculated based on the ratio of airborne particle concentrations in the filtration side and the generator side. Flow rate and pressure drop between the two sides were also recorded to compare flow resistances of initial air filters and air filters with ionic liquid-based coatings.

Example 28: Cytotoxicity Test

A549 lung epithelial cells were grown in 25 $cm^2$ flasks with Dulbecco's modified Eagle's medium (DMEM) supplemented with 10% fetal bovine serum, 100 U/ml streptomycin, and 50 U/ml penicillin at 37° C. in a humidified atmosphere with 5% $CO_2$. A subculture of confluent monolayers was carried out using 0.05% trypsin, 0.53 mmol/l ethylenediaminetetraacetic acid in calcium and magnesium-free Hanks balanced salt solution (HBSS). Prominent dome formation was seen after 2-day post-confluence by phase contrast microscopy. For the 3-(4,5-dimethylthiazol-2-yl)-2,5-diphenyltetrazolium bromide (MTT) assay, cells were plated in 96-well microplates at $2\times10^5$ cell/well for 6 hours, then the media were gently changed to remove non-adherent cells. The plates were used for assays after 24 hours. After 4-hour exposure to ionic liquids diluted with DMEM, the media were removed, the monolayer gently washed in serum free DMEM and 200 µl of MTT (1 mg/ml in HBSS) was added to each well and incubated for 4 hours. The media were replaced with 100 µl of dimethyl sulfoxide for 20 minutes, and the absorbances at 595 nm were determined using a microplate reader. Each group consisted of 4 wells and the experiment was carried out three times. The inhibition rate, I, is given by $$I = \frac{(C-B)-(S-B)}{C-B} \times 100\%,$$

where C is the absorbance of the control group containing the cell solution and MTT, which indicates the number of maximum living cells, S is the absorbance of the sample group containing the cell solution, ionic liquids and MTT, which indicates the number of living cells in the ionic liquids, and B is the absorbance of the blank group containing only pure culture media and MTT, which is set reduce interference by the natural environment.

It is to be understood that the ionic liquid-based coating and method of making articles coated with the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A filter, comprising:
  a porous substrate selected from the group consisting of a ceramic membrane, cellulose paper, and a high-efficiency particulate air filter; and a coating applied to the porous substrate, wherein the coating comprises:
  at least one ionic liquid;
  an adhesive; and
  at least one additive selected from the group consisting of a disinfectant, a viscosity modifier, a pH buffer, a fragrance, and combinations thereof,
whereby the filter has disinfecting and/or antimicrobial properties.

2. The filter as recited in claim 1, wherein the at least one ionic liquid comprises a cation selected from the group consisting of imidazolium, pyridinium, ammonium, phosphonium, and combinations thereof.

3. The filter as recited in claim 1, wherein the at least one ionic liquid comprises an anion selected from the group consisting of chloride, bromide, iodide, nitrate, hydrogen sulfate, acetate, tetrafluoroborate, hexafluorophosphate, thiocyanate, trifluoromethanesulfonate, bis(trifluoromethylsulfonyl)imide, and combinations thereof.

4. The filter as recited in claim 1, wherein the adhesive is selected from the group consisting of a metal oxide adhesive, a zeolite adhesive, a carbonaceous particle-based adhesive, and combinations thereof.

5. The filter as recited in claim 1, wherein the at least one additive comprises the disinfectant, and wherein the disinfectant is selected from the group consisting of antimicrobial metal salts, antimicrobial metal particles, phytochemicals, essential oils, oxidizing disinfectants, and combinations thereof.

6. A filter, comprising:
a porous substrate; and
a coating applied to the porous substrate, wherein the coating comprises:
  at least one ionic liquid;
  an adhesive selected from the group consisting of a metal oxide adhesive, a zeolite adhesive, a carbonaceous particle-based adhesive, and combinations thereof; and
  at least one additive selected from the group consisting of a disinfectant, a viscosity modifier, a pH buffer, a fragrance, and combinations thereof,
whereby the filter has disinfecting and/or antimicrobial properties.

7. The filter as recited in claim 6, wherein the at least one ionic liquid comprises a cation selected from the group consisting of imidazolium, pyridinium, ammonium, phosphonium, and combinations thereof.

8. The filter as recited in claim 6, wherein the at least one ionic liquid comprises an anion selected from the group consisting of chloride, bromide, iodide, nitrate, hydrogen sulfate, acetate, tetrafluoroborate, hexafluorophosphate, thiocyanate, trifluoromethanesulfonate, bis(trifluoromethylsulfonyl)imide, and combinations thereof.

9. The filter as recited in claim 6, wherein the at least one additive comprises the disinfectant, and wherein the disinfectant is selected from the group consisting of antimicrobial metal salts, antimicrobial metal particles, phytochemicals, essential oils, oxidizing disinfectants, and combinations thereof.

* * * * *